US011692465B2

(12) United States Patent
Ricco et al.

(10) Patent No.: US 11,692,465 B2
(45) Date of Patent: Jul. 4, 2023

(54) INTERNAL COMBUSTION ENGINE WITH FAST COMBUSTION AND METHOD OF CONTROL OF SUCH AN ENGINE

(71) Applicant: C.R.F. Società Consortile per Azioni, Orbassano (IT)

(72) Inventors: Raffaele Ricco, Orbassano (IT); Sergio Stucchi, Orbassano (IT); Carlo Mazzarella, Orbassano (IT); Onofrio De Michele, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 17/621,823

(22) PCT Filed: Aug. 6, 2020

(86) PCT No.: PCT/IB2020/057442
§ 371 (c)(1),
(2) Date: Dec. 22, 2021

(87) PCT Pub. No.: WO2021/111197
PCT Pub. Date: Jun. 10, 2021

(65) Prior Publication Data
US 2022/0243621 A1    Aug. 4, 2022

(30) Foreign Application Priority Data
Dec. 2, 2019   (EP) ..................................... 19212910

(51) Int. Cl.
*F01L 9/14*   (2021.01)
*F01L 1/26*   (2006.01)
(Continued)

(52) U.S. Cl.
CPC ................. *F01L 9/14* (2021.01); *F01L 1/267* (2013.01); *F01L 9/40* (2021.01); *F02D 13/0226* (2013.01);
(Continued)

(58) Field of Classification Search
CPC ... F01L 1/053; F01L 1/25; F01L 1/267; F01L 9/14; F01L 9/40; F01L 2013/101;
(Continued)

(56) References Cited

U.S. PATENT DOCUMENTS

| | | | |
|---|---|---|---|
| 6,553,961 B2 * | 4/2003 | Hammoud | F02D 13/0234 123/308 |
| 2014/0033997 A1 * | 2/2014 | Stucchi | F02D 43/04 123/90.15 |
| 2019/0345880 A1 * | 11/2019 | McAllister | F01L 1/053 |

FOREIGN PATENT DOCUMENTS

| | | |
|---|---|---|
| EP | 1555398 A1 | 7/2005 |
| EP | 2796675 A1 | 10/2014 |

(Continued)

OTHER PUBLICATIONS

International Search Report and Written Opinion dated Oct. 8, 2020. 12 pages.

*Primary Examiner* — Jorge L Leon, Jr.
(74) *Attorney, Agent, or Firm* — RMCK Law Group PLC

(57) ABSTRACT

An internal combustion engine includes an electro-hydraulic system for variable actuation of intake valves where each cylinder has two intake valves, associated with two intake conduits. A first conduit is generates within the cylinder a tumble motion of airflow introduced therein, when the intake valve associated thereto is at least partially opened. The second intake conduit generates within the cylinder a swirl motion of airflow introduced therein when the second intake valve is at least partially opened. A controller of controls one or more control valves to open only one of the (Continued)

intake valves of each cylinder in a condition of reduced engine operation, below a predetermined load and/or a predetermined speed of the engine, and to always open both intake valves in the remaining conditions of engine operation. The first intake valve is the only valve to be opened in the reduced engine operation condition.

22 Claims, 10 Drawing Sheets

(51) Int. Cl.

| | |
|---|---|
| *F02D 13/02* | (2006.01) |
| *F01L 9/40* | (2021.01) |
| *F02D 41/00* | (2006.01) |
| *F01L 1/25* | (2006.01) |
| *F01L 1/053* | (2006.01) |
| *F01L 13/00* | (2006.01) |
| *F01L 1/46* | (2006.01) |

(52) U.S. Cl.
CPC .......... *F02D 13/0257* (2013.01); *F01L 1/053* (2013.01); *F01L 1/25* (2013.01); *F01L 1/462* (2013.01); *F01L 2013/101* (2013.01); *F01L 2800/06* (2013.01); *F01L 2820/031* (2013.01); *F02D 2041/001* (2013.01); *F02D 2041/0015* (2013.01)

(58) Field of Classification Search
CPC ............ F01L 2800/06; F01L 2820/031; F02D 13/0226; F02D 13/0257; F02D 2041/001; F02D 2041/0015
USPC ......... 123/90.12, 90.15, 90.22, 90.27, 90.48, 123/90.65
See application file for complete search history.

(56) References Cited

FOREIGN PATENT DOCUMENTS

| | | |
|---|---|---|
| EP | 3181842 A1 | 6/2017 |
| EP | 3517764 A1 | 7/2019 |

\* cited by examiner

INTERNAL COMBUSTION ENGINE WITH FAST COMBUSTION AND METHOD OF CONTROL OF SUCH AN ENGINE

CROSS-REFERENCE TO RELATED APPLICATIONS

This application is a 371 National Stage of International Application No. PCT/IB2020/057442, filed Aug. 6, 2020, which claims priority to European Patent Application No. 19212910.4 filed Dec. 2, 2019. The disclosure of each of the above applications is incorporated herein by reference in its entirety.

FIELD OF THE INVENTION

The present invention relates to internal combustion engines and methods for controlling operation thereof.

PRIOR ART

Increasingly strict rules in relation to $CO_2$ and particulate emissions in gasoline and diesel internal combustion engines are encouraging designers towards ever larger use of a number of technologies (such as high compression ratio engines, engines operating according to the Miller—Atkinson cycle, dilution of the air-gasoline mixture with cooled exhaust gas recirculation, direct injection of high pressure fuel, deactivation of one or more engine cylinders) which however introduce new problems with regard to maximum power, fuel consumption and homogeneity of the air-gasoline mixture.

In view of overcoming these drawbacks, it has been also proposed to use engine intake conduits and/or intake valves configured so as to impart predetermined characteristics to the airflow which enters into each cylinder, in order to improve mixing and/or accelerate combustion and/or avoid or reduce any process which may be detrimental to the engine efficiency.

Figure 10:
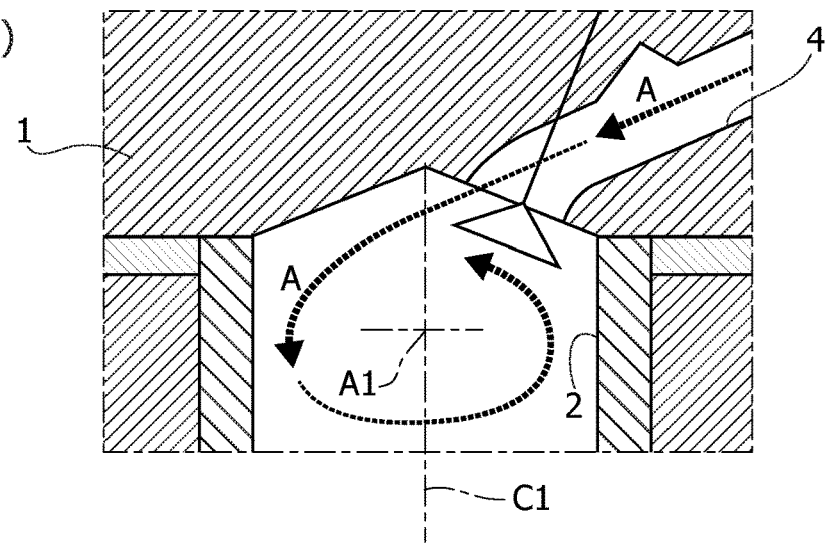
Figure 11:
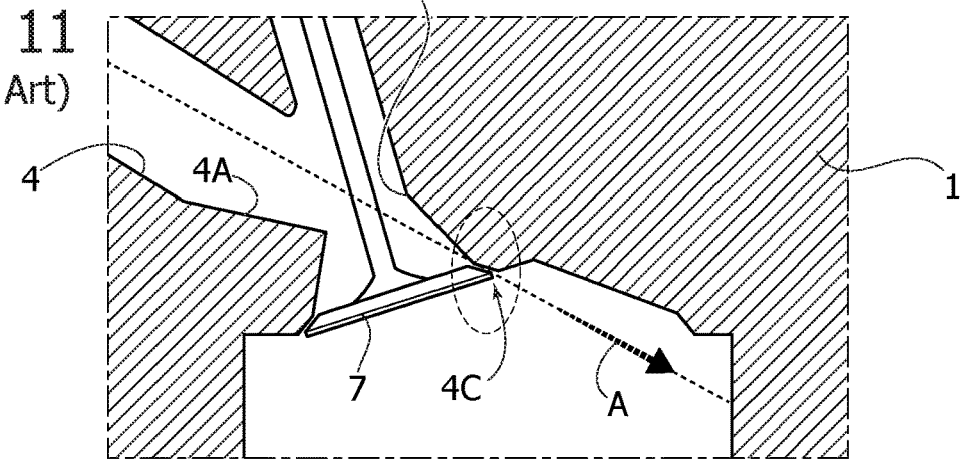

A first old and well-known solution is that of imparting a tumble motion to the airflow, i.e. a vortex motion around an axis orthogonal to the cylinder axis. For this purpose, the intake conduit is configured so that when the intake valve associated thereto is opened, the airflow entering into the cylinder is almost entirely conveyed on one side of the intake valve and gives rise to a tumble vortex, rotating in one and same direction around an axis orthogonal to the cylinder axis. An example of an intake conduit configured for generating a tumble motion is shown in FIGS. 10, 11 of the annexed drawings, which will be described in the following. In order to obtain, or increase, a tumble effect, it is also known to provide masked intake valves, i.e. valves provided with a shield-shaped projecting portion, which favours the inlet of the airflow into the cylinder of the engine along a desired direction.

However, it has been found that adopting intake valves with a high tumble ratio (the tumble ratio is defined as the ratio between the speed of rotation of the airflow within the cylinder and the rotational speed of the engine) and/or adopting masked intake valves cause the drawback of reducing the filling coefficient of the cylinder (i.e. the quantity of air which enters into the cylinder) with a resulting decrease of the engine power.

It has also been proposed in the past to impart a swirl motion to the airflow entering into the cylinder, i.e. a spiral-like motion around the axis of the cylinder, through the adoption of a corresponding configuration and a suitable orientation of the intake conduits. This technique is particularly advantageous in the case of gasoline direct injection engines, where there is a problem due to impingement of the fuel jet against the cylinder wall, particularly at low temperatures, with a resulting reduced evaporation of the gasoline. This problem increases at higher engine loads, when a higher quantity of fuel must be introduced into the cylinder.

Adopting a swirl motion for the airflow which enters into the cylinder is useful, since the fuel jet is intercepted by the air vortex and is not able to hit the cylinder wall.

In order to maximize the advantages of the two above mentioned technologies (tumble and swirl) it has been also proposed (see for example US Re 42,667) to provide, for each cylinder, two intake valves with respective intake conduits which are configured so that one of them generates a tumble motion, while the other generates a swirl motion.

In particular, in the solution disclosed in the above cited document US Re 42,667, it has been proposed to provide an activation only of the intake valve associated to the intake conduit which generates the swirl motion in a condition of reduced operation of the engine (i.e. at low engine loads and/or low engine rotational speeds) and to activate both the intake valves, or only the intake valve associated to the intake conduit which generates a tumble motion, in the remaining operational conditions of the engine.

Naturally, the need of controlling the two intake valves in a differentiated manner implies in general, in the known solutions of the type indicated above, the use of separate actuating systems. For example, in the case of the solution known from document US Re 42,667, two separate electromagnets are provided for actuating the two intake valves associated to each cylinder. However, this solution implies various drawbacks. In modern engines, particularly in supercharged engines, the load of the springs which bias the intake valves towards their closed position is very high. As a consequence of this, the above described known art implies the use of very powerful electromagnets which imply very high electric currents and greatly increase frictions. Furthermore, the electromagnets have an on/off operation, so that the intake valves are always either completely closed or completely opened, without any possibility to impart a partial lift thereto.

Therefore, the need is felt of a system for actuating the intake valves of the engine which is able to better satisfy the above indicated requirements.

Since a long time, the Applicant has been developing internal combustion engines comprising a system for variable actuation of the intake valves, which is marketed under the trademark "Multiair", having a high degree of operational flexibility. See for example EP 0 803 642 B1, EP 1 555 398, EP 1 508 676 B1, EP 1 674 673 B1 and EP 2 261 471 A1, EP 2 693 007 A1, EP 2 801 706 A1, all in the name of the same Applicant.

According to this known art developed by the Applicant (see for example EP 2 801 706 A1) an internal combustion engine is provided, comprising, for each cylinder:
 a combustion chamber,
 first and second intake conduits and at least one exhaust conduit opening on said combustion chamber,
 first and second intake valves associated to said first and second intake conduits respectively and at least one exhaust valve associated to said at least one exhaust conduit, said intake and exhaust valves being provided with respective return springs which bias them towards a closed position,
 a camshaft for actuating the intake valves, by means of respective tappets, wherein each intake valve is driven by a respective tappet against the action of said return spring with the interposition of a hydraulic circuit including a volume of a fluid under pressure towards which a pumping piston associated to the valve tappet is facing, said volume of fluid under pressure being adapted to communicate with a chamber of a hydraulic actuator associated to said intake valve, each intake valve being associated to at least one electrically operated control valve adapted to communicate said volume of fluid under pressure with a low pressure discharge channel (a discharge channel), in order to uncouple said intake valve from the respective tappet and cause a quick closing of said intake valve due to the bias of the respective return spring, at least one electronic controller, for controlling said at least one control valve, for varying the opening and/or closing time and the lift of each intake valve as a function of one or more operational parameters of the engine.

The present invention has been developed starting from considering that the above described "Multiair" technology results to be surprisingly advantageous for the purpose of solving the technical problems which have been discussed in the foregoing.

OBJECT OF THE INVENTION

A first object of the present invention is that of providing an internal combustion engine which is able to overcome all the drawbacks of the above described known solutions, so as to satisfy the ever stricter rules with regard to $CO_2$ and particulate emissions on one hand, and to be not jeopardized from the power and consumption stand point, on the other hand.

A further particular object of the invention is that of reaching the above indicated goal by imparting a type of motion to the airflow which enters into the cylinder which results to be the best solution in order to increase the speed of combustion within the cylinder, particularly at low engine loads.

A further particular object of the invention is that of reaching the above indicated goal by providing a system for actuating the intake valves which does not involve the drawbacks of the above mentioned known solutions.

Finally, a further object of the invention is that of achieving the above indicated goals with the use of a system for actuating the intake valves which is relatively simple and inexpensive and such as to provide a high operational flexibility.

SUMMARY OF THE INVENTION

The invention provides an internal combustion engine having all the features of the above indicated Multiair technology (and defined in the preamble of the annexed claim 1) and further characterized in that:

said first intake conduit is configured so as to generate a tumble motion within the cylinder of the airflow introduced into the cylinder trough said first intake conduit when the intake valve associated thereto is at least partially opened, said second intake conduit is configured so as to generate a swirl motion within the cylinder of the airflow introduced into the cylinder through said second intake conduit when the second intake valve is at least partially opened, said electronic controller is configured and programmed for controlling said at least one control valve so as to partially or entirely open only one of the two intake valves of each cylinder in a condition of reduced operation of the engine, below a predetermined engine load and/or below a predetermined engine rotational speed, and so as to always open both the intake valves in the remaining conditions of operation of the engine, and in that the intake valve which is the only intake valve to be partially or entirely opened in said condition of reduced operation of the engine is said first intake valve which is associated to said first intake conduit, which is configured for generating a tumble motion.

A first important advantageous difference of the engine according to the invention with respect to the above mentioned known solutions which already provided joint tumble and swirl motions (such as that disclosed in document US Re 42,667) lies in that in the case of this known solution the intake valves are driven by electromagnets and therefore have an on/off operation, i.e. they are either completely closed or completely opened, whereas the Multiair technology enables a lift movement lower than the maximum lift to be imparted to a determined intake valve.

A further important difference of the invention with respect to the above mentioned known solution lies in that in the case of the invention in the condition of reduced operation of the engine (at low engine loads and/or low engine rotational speeds) only the intake valve associated to the intake conduit which generates a tumble motion of the airflow introduced into the engine is activated. In this manner, the effect is favoured of an increase of the speed of combustion (at low loads operation of the engine according to modern Miller—Atkinson super expanded cycles in fact requires an increase of turbulence) which can be obtained at low loads of the engine without introducing a swirl movement, which is instead necessary at high loads for avoiding an impingement of a fuel particles introduced with the fuel jet and not yet evaporated against the cylinder walls (which gives rise to particulate formation).

In a first embodiment, it is provided that the two intake valves of each cylinder are controlled by a single cam of said camshaft through a single hydraulic circuit and that the communication of the hydraulic actuators of the two intake valves with said discharge channel is controlled by a single electrically operated control valve having three ways and three positions. This specific embodiment of the control valve is known per se and has been disclosed for example in document EP 2 801 706 A1 of the same Applicant. However, this known component is used herein for the first time in order to control tumble and swirl motions according to the new operational modes which have been indicated in the foregoing.

According to this embodiment, the three ways and three positions control valve comprises:

an inlet which permanently communicates with said volume of fluid under pressure and with the actuator of said first intake valve, and two outlets respectively communicating with the actuator of the second intake valve and with said discharge channel, said control valve having the following three operative positions:

a first position, in which the inlet communicates with both the outlets, so that the volume of fluid under pressure and the actuators of both the intake valves are put to discharge and the intake valves are both kept closed by their return springs, a second position, in which the inlet communicates only with the outlet connected to the actuator of the second intake valve and does not communicate instead with the outlet connected to the discharge channel, so that the volume of a fluid under pressure is insulated with respect to the discharge channel and the actuators of both the intake valves communicate with the volume of fluid under pressure, so that the intake valves are both active, and a third position, in which the inlet does not communicate with any of the two outlets, so that said volume of fluid under pressure is insulated with respect to the discharge channel and said first intake valve is active, whereas the second intake valve is insulated with respect to the volume of fluid under pressure and with respect to the discharge channel and it is not in conditions to be opened.

A second embodiment of the ideal solution which is at the basis of the present invention has a configuration of the hydraulic system for controlling the two intake valves which is totally novel, also taken alone, with respect to the state of the art, this new configuration forming the subject also of a co-pending application of the same Applicant.

According to the second embodiment, the two intake valves of each cylinder are controlled by a single cam of said camshaft through a single hydraulic circuit and a communication of the hydraulic actuators of the two intake valves with said discharge channel is controlled by means of two electrically operated control valves, both of an on/off and two positions type, which are arranged in series relative to each other along a hydraulic line for communication between the volume of fluid under pressure and the discharge channel. Said communication hydraulic line includes, starting from said volume of fluid under pressure towards said discharge channel:

a first branch-off point connected to the hydraulic actuator of said first intake valve, associated to said first intake conduit which is configured for generating a tumble motion, a second branch-off point connected to the hydraulic actuator of said second intake valve, associated to said second intake conduit which is configured for generating a swirl motion.

A first of said control valves is arranged between said second branch-off point and the discharge channel, so that when said first control valve is closed, the communication with the discharge channel is interrupted for both the hydraulic actuators of the intake valves.

A second control valve is arranged in said communication line between the two above mentioned branch-off points, so that when said second control valve is closed:

the actuator of the first intake valve is always in communication with the volume of fluid under pressure, whereas its communication with the discharge channel is anyway interrupted, independently from the condition of operation of the first control valve, the actuator of the second intake valve does no longer communicates with the volume of fluid under pressure, independently from the conditional operation of the first control valve.

Due to the above indicated features, the engine according to this embodiment is able to operate in the above described manner (generating a tumble motion of the airflow in the cylinders of the engine at low loads and/or low speeds of the engine, and generating instead a combined tumble and swirl motion in the remaining conditions of operation of the engine); at the same time, the electro-hydraulic system which is used for controlling the operation of the intake valves is extremely simple, of reduced cost and implies also a simplified programming.

It is also possible to adopt a different embodiment which is not however the preferred embodiment from the point of view of simplicity of manufacture and reduction of production costs, in which different cams are provided for operating the two intake valves of each cylinder, respectively. To these two cams, there are associated two tappets and two separate hydraulic circuits, including two respective electrically operated control valves, each for controlling the communication of the hydraulic actuator of the respective intake valve with the low pressure discharge channel.

In all the above mentioned embodiments, it is also possible to provide, by way of example, that the intake valve associated to the intake conduit which generates the tumble motion has always conventional lift cycles or, advantageously, cycles in which the valve lift is greater than the conventional lift (up to a maximum of double lift) whereas the other intake valve which is associated to the intake conduit which generates the swirl motion is kept closed or is opened only partially, according to different operational modes.

A greater opening lift with respect to the conventional lift (by conventional lift the case is meant in which both the valves are opened with a lift variation corresponding to the cam profile) enables an increase in the dynamic conditions of the air entering into the combustion chamber, to advantage for the turbulence of the air fuel mixture being formed.

In particular, the electronic controller may be configured and programmed for controlling the above mentioned at least one control valve so that, at least in one intermediate conditional operation of the engine, above said condition of reduced operation, the second intake valve is controlled according to a partial lift mode, in which it has a lift movement smaller with respect to its maximum lift.

In one example, the electronic controller can be configured and programmed so that in the above mentioned partial lift mode, the second intake valve remains in a fixed position, corresponding to a predetermined partial lift, during its opening cycle.

Alternatively, the electronic controller can be configured and programmed so that in said partial lift mode, said second intake valve is controlled according to a late opening mode, in which it is opened with a delay with respect to the starting time of the lift cycle caused by the profile of the respective actuating cam.

In particular, the above mentioned electronic controller can be configured and programmed so that in the above mentioned late opening mode, said second intake valve is again closed together with the first intake valve, at the end of the lift cycle determined by the profile of the respective actuating cam.

Alternatively, the electronic controller may be configured and programmed so that in said partial lift mode of the second intake valve, the latter is controlled according to a multi-lift mode, in which it is opened partially and then completely closed again more times during a same lift cycle of the respective actuating cam.

Yet according to an alternative solution, the electronic controller is configured and programmed so that in said partial lift mode of the second intake valve, the latter is controlled according to a late closing mode, in which it is opened partially together with the first intake valve and then closed completely with a delay with respect to the end of a lift cycle of the respective actuating cam.

Finally, the electronic controller may be configured and programmed for postponing opening of the valves, both when they are actuated simultaneously, and when only one of them is opened, with respect to the position of the piston corresponding to the Top Dead Centre TDC, so as to exploit the speed of the piston during the intake stage for further increasing the turbulence in the combustion chamber.

The different actuating modes of the intake valves which have been mentioned above will be described in detail in the following. However, they represent only examples of use of the system according to the invention.

The invention also provides the method for controlling the engine.

DESCRIPTION OF SOME EMBODIMENTS OF THE INVENTION

Figure 1:
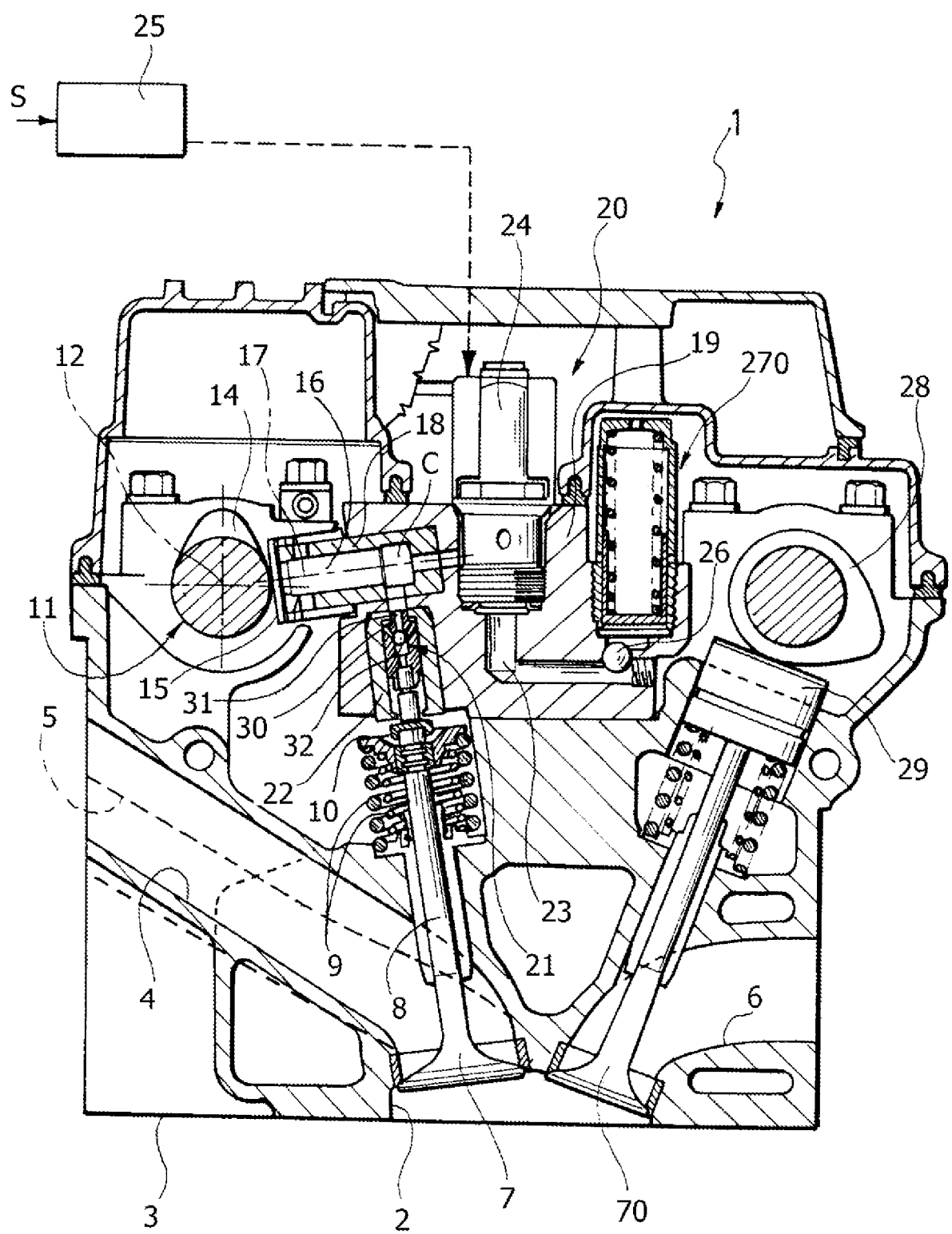
Figure 2:
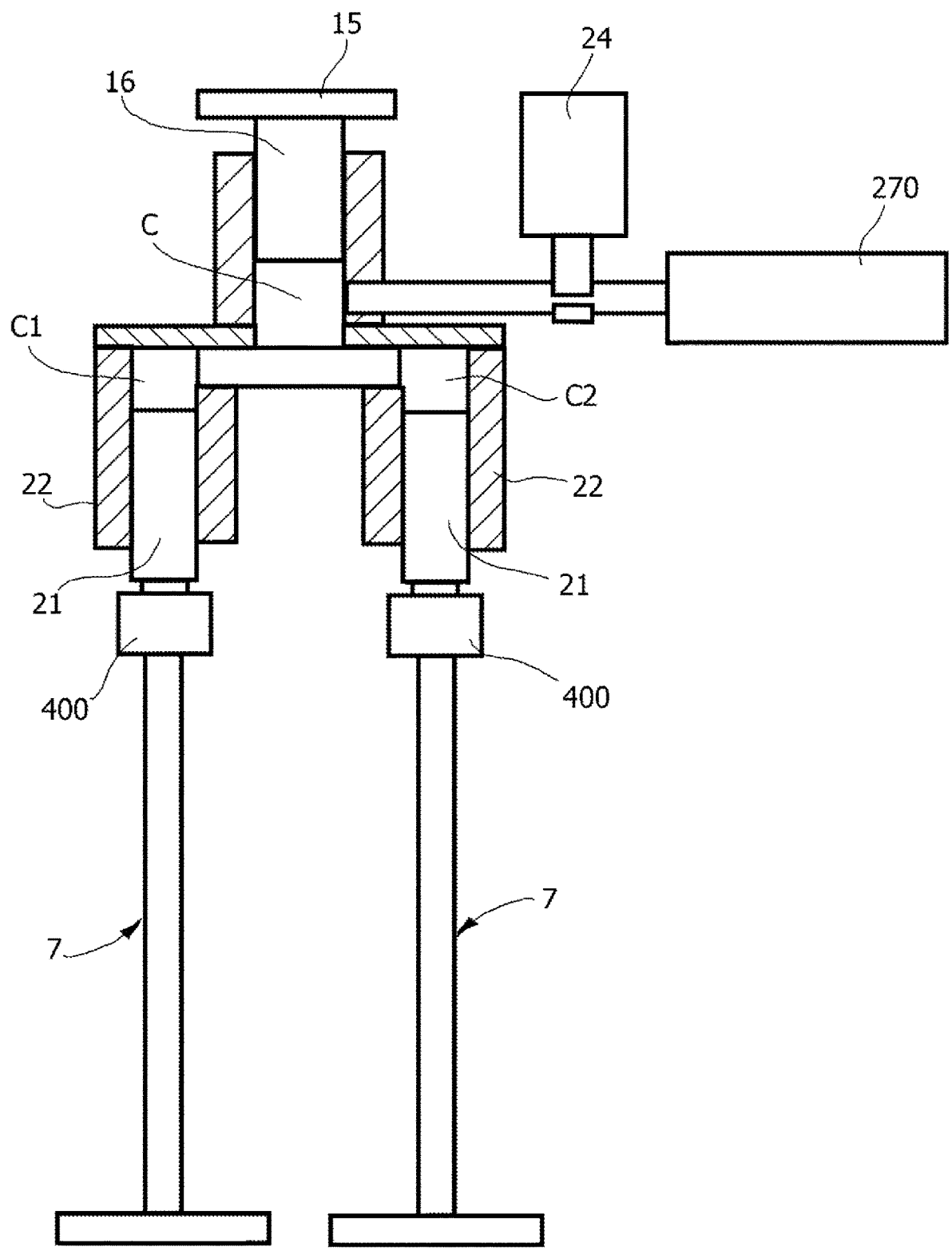
Figure 3:
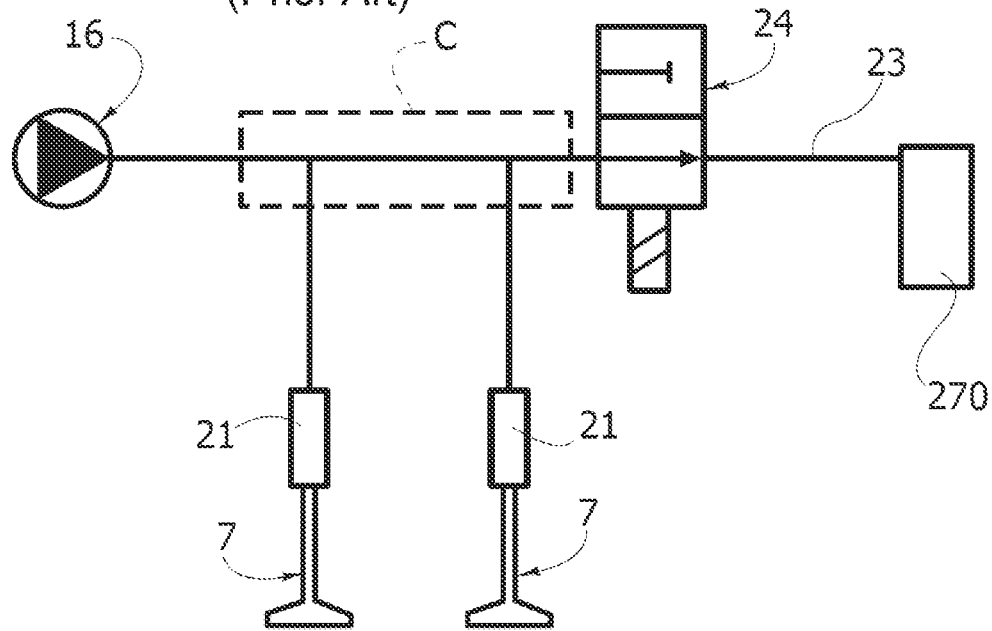
Figure 4:
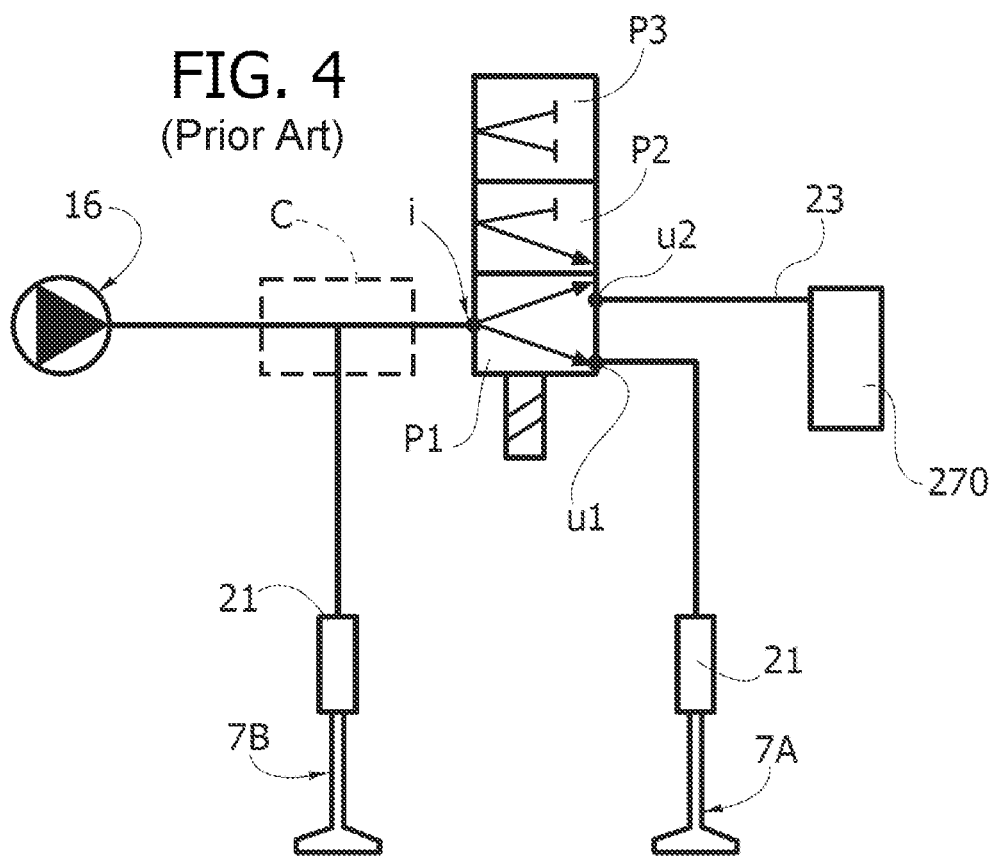
Figure 5:
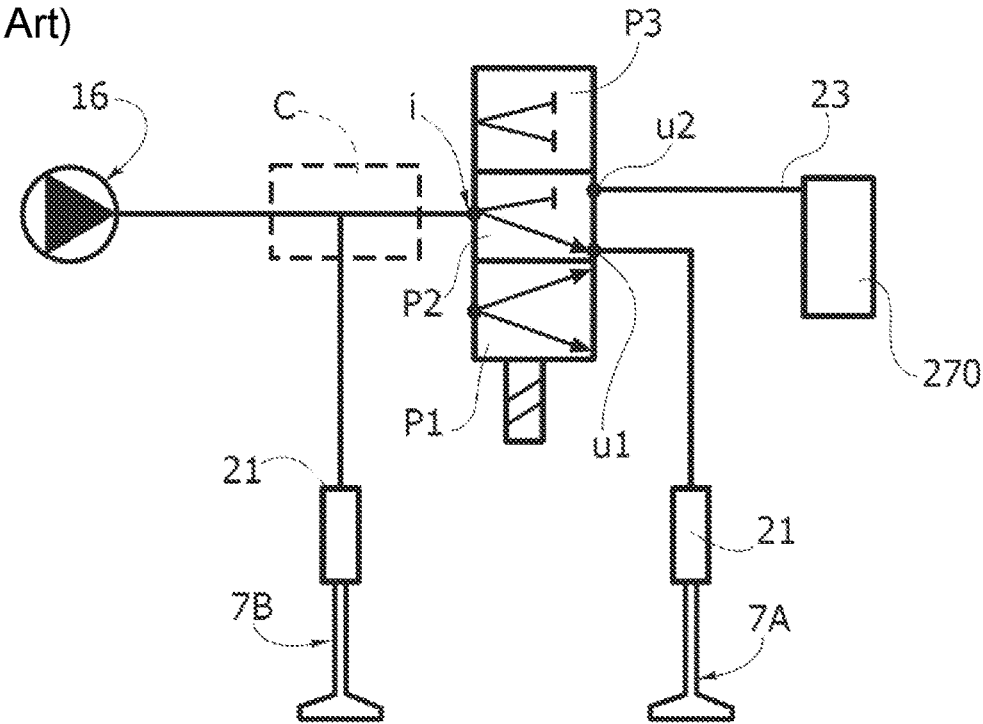
Figure 6:
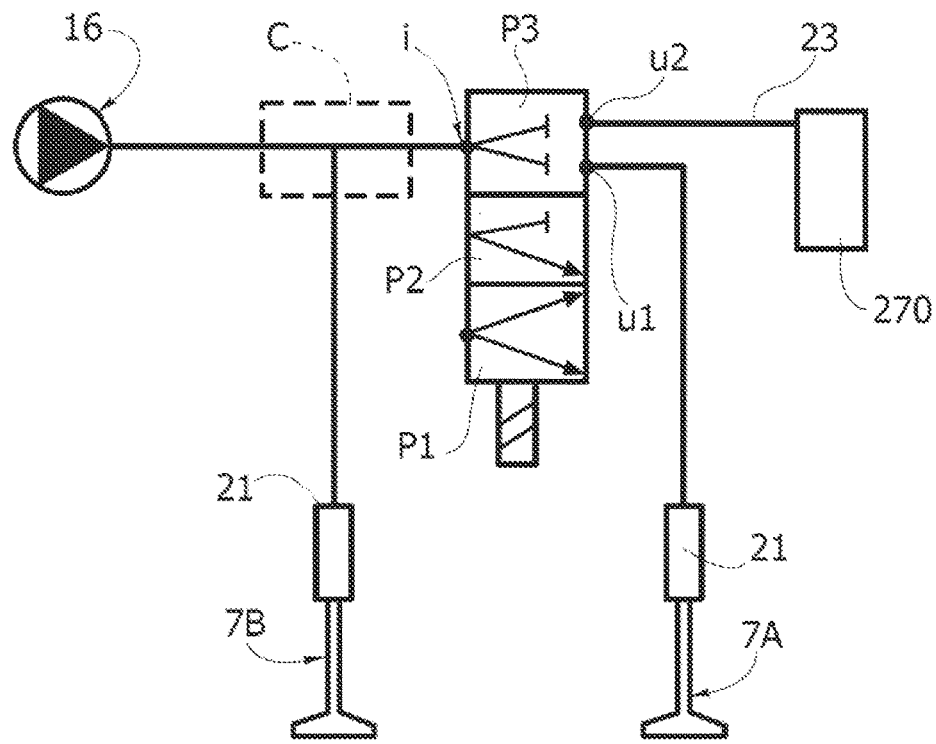
Figure 7:
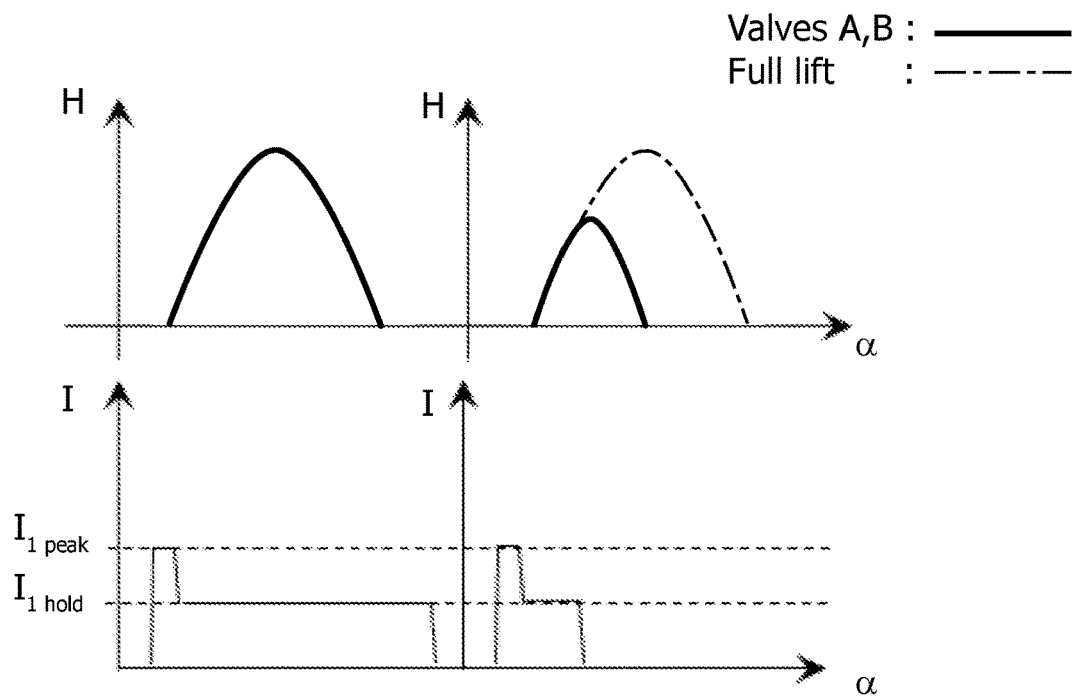
Figure 8:
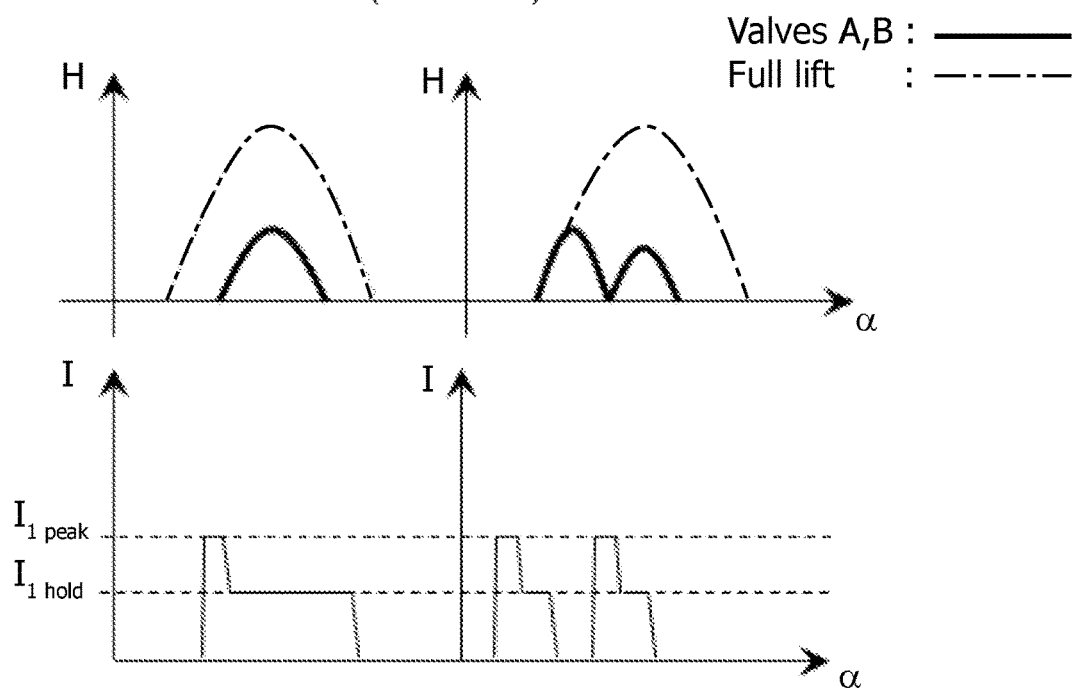
Figure 9:
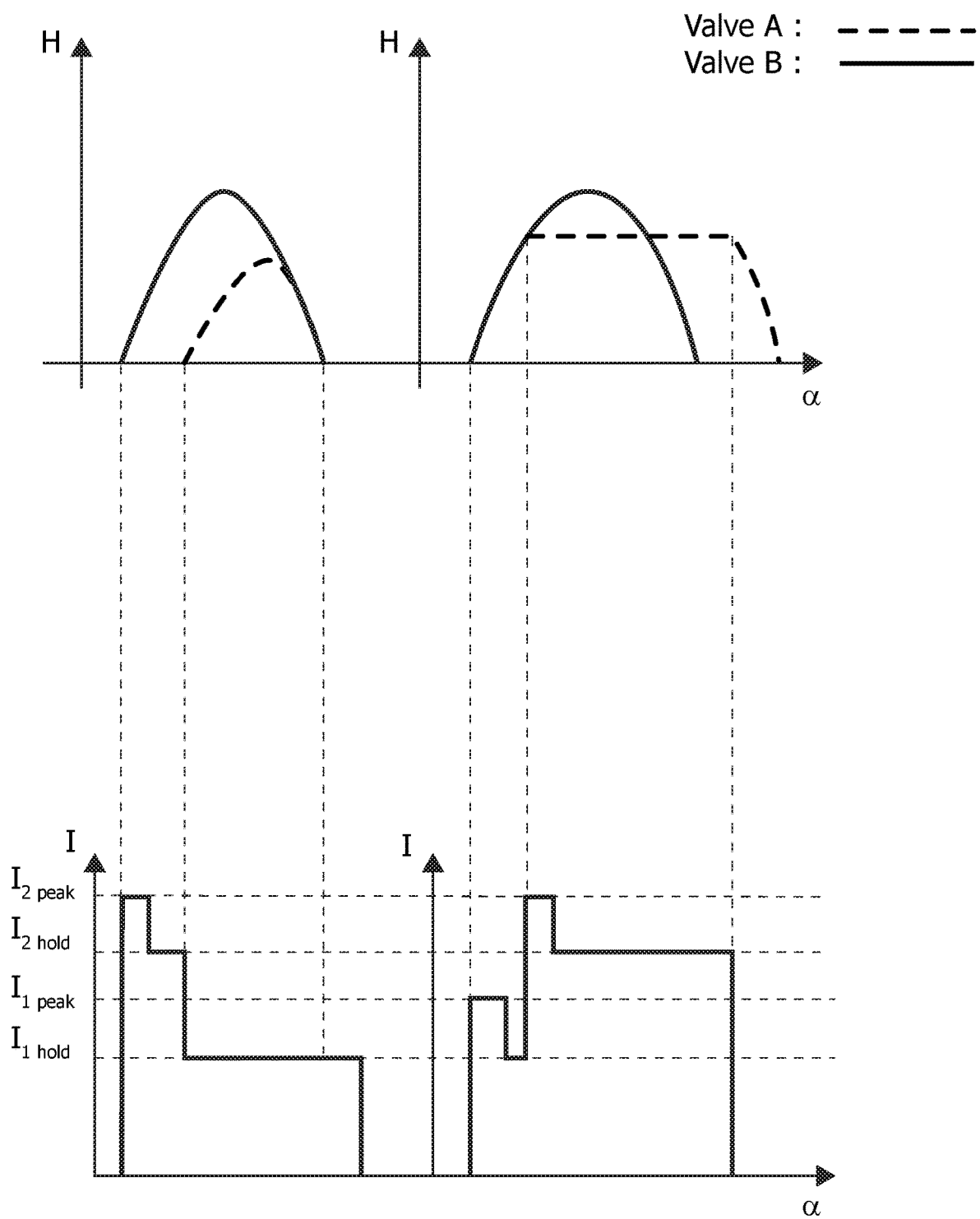
Figure 12:
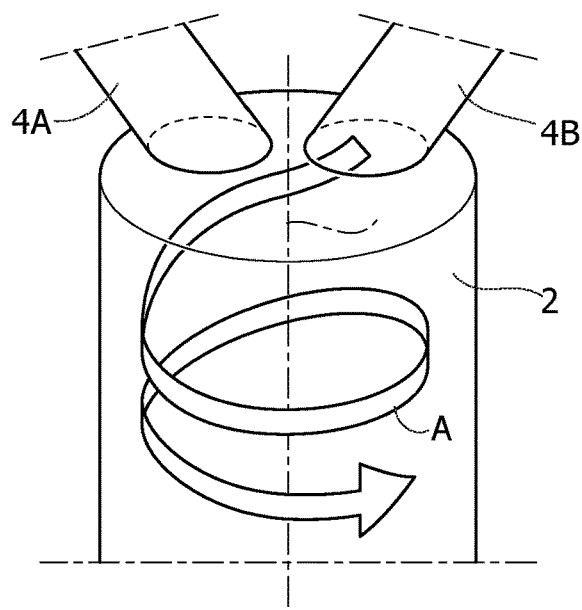
Figure 13A:
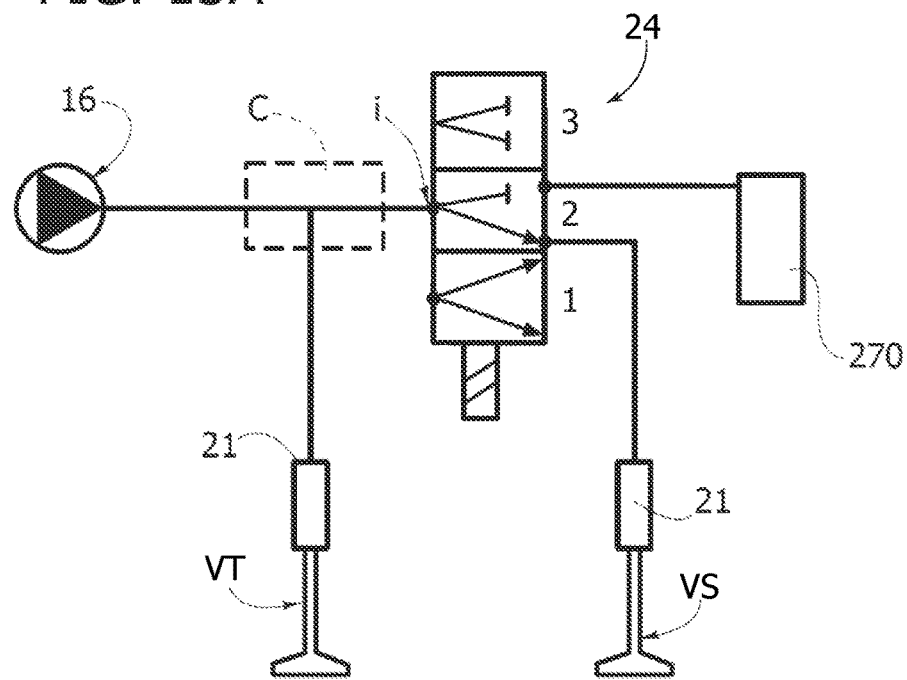
Figure 13B:
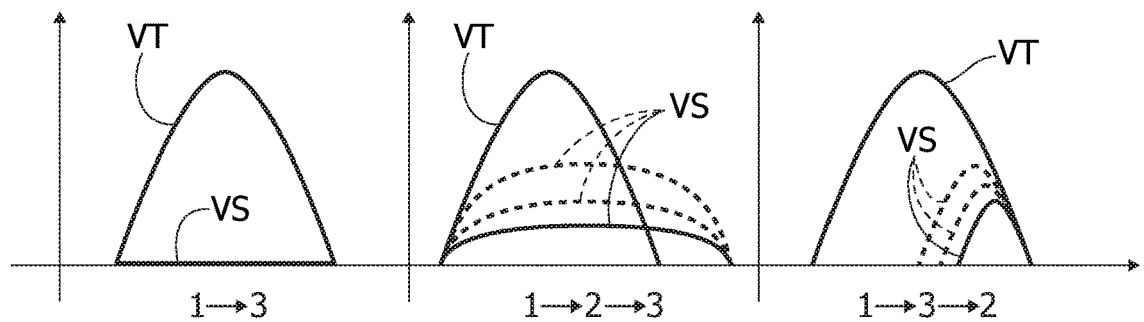
Figure 13B:
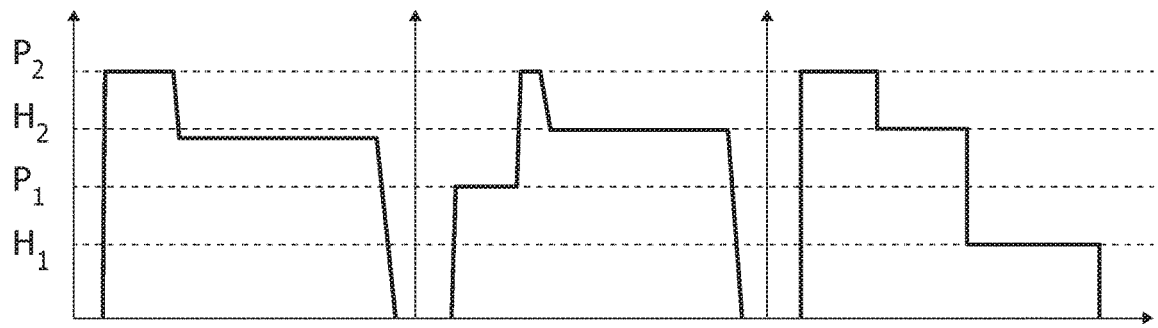
Figure 14:
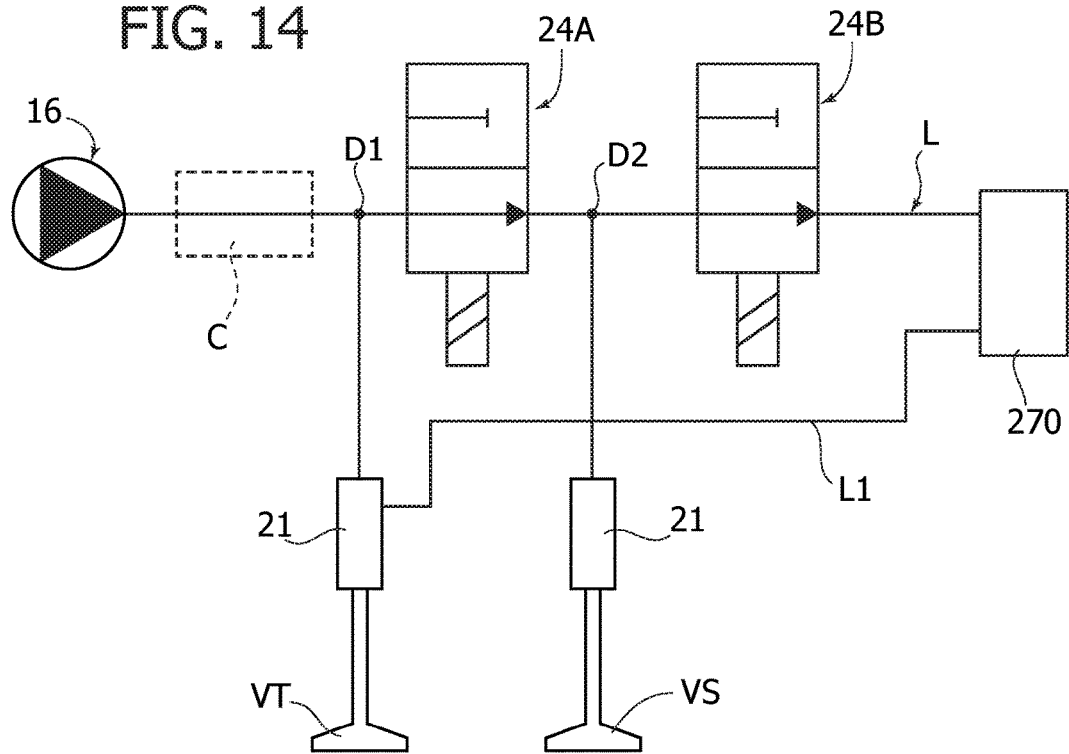
Figure 16:
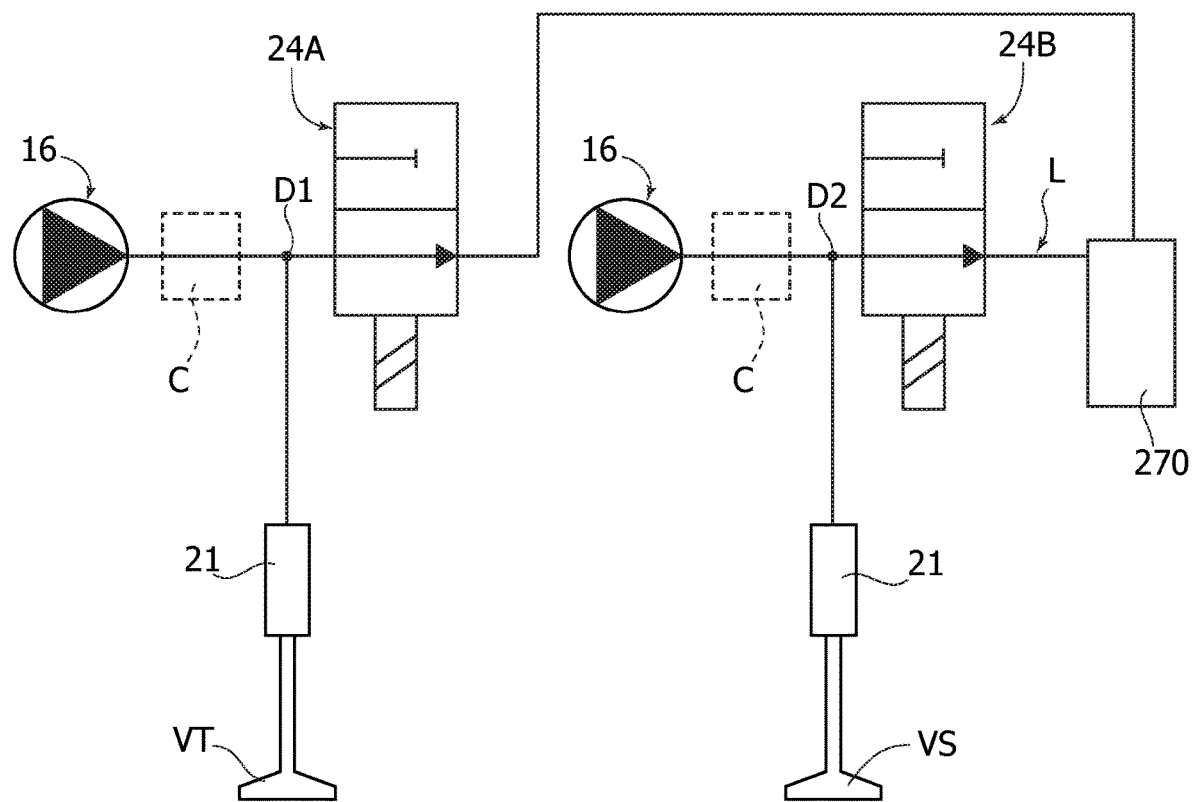

Further features and advantages of the invention will become apparent from the description which follows with reference to the annexed drawings, given purely by way of non limiting example, in which:

FIG. 1 shows a cross-sectional view of the cylinder head of an internal combustion engine provided with a multi-air (registered trademark) system for variable actuation of the intake valves, according to what is illustrated in document EP 0 803 642 B1, FIGS. 2, 3 show the control system for two intake valves associated to a same cylinder of the engine, in a multi-air system of the conventional type described for example in EP 2 261 471 A1, FIGS. 4-6 show a diagram of the control system for the two intake valves, in the embodiment which makes use of a single 3-way 3-position control valve, according to what is described in document EP 2 801 706 A1 of the same Applicant, FIGS. 7-9 are diagrams which show standard modes of operation of the two intake valves which can be obtained with the activation system of FIGS. 4-6, FIG. 10 diagrammatically shows a tumble motion of the air flow introduced into a cylinder of the engine, FIG. 11 shows an exemplary configuration of an intake conduit of known type which is used for give rise to the above mentioned tumble motion, with the further aid due to the presence of a masking of the intake valve, FIG. 12 is a diagrammatic perspective view which shows a swirl motion of the airflow introduced into the cylinder, FIG. 13 shows diagrams corresponding to different modes of operation of the intake valves in a first embodiment of the invention in which a system for actuation of the intake valves of the type shown in FIGS. 4-6 is used in combination with the adoption of intake conduits associated to the two intake valves of each cylinder which are configured for generating a tumble motion and a swirl motion, respectively, FIG. 14 shows a new embodiment for an electronic hydraulic actuation system for the intake valves of the engine which can be advantageously used in a second embodiment of the present invention in order to control the two intake valves of each cylinder associated to the two intake conduits which are configured for generating the tumble motion and the swirl motion respectively, FIG. 5 shows diagrams which illustrate different modes of operation of the intake valves which can be obtained through the actuation system of FIG. 14 and, FIG. 16 shows the diagram of a further actuation system for the intake valves which can be used in a third embodiment of the present invention.

THE MULTI-AIR TECHNOLOGY—KNOWN SOLUTIONS

FIG. 1 of the annexed drawings show a cross-sectional view of an engine provided with a "multi-air" system, as described in European patent EP 0 803 642 B1.

With reference to this FIG. 1, the engine shown therein is a multi-cylinder engine, such as a engine with four cylinders in line, comprising a cylinder head 1. The head 1 comprises, for each cylinder, a cavity 2 formed in the base surface 3 of head 1, defining the combustion chamber, in which two intake conduits 4, 5 and two exhaust conduits 6 open. The communication of the two intake conduits 4, 5 with the combustion chamber 2 is controlled by two intake valves 7, of the conventional mushroom-like type, each comprising a stem 8 slideably mounted within the body of head 1.

Each valve 7 is biased towards the closed position by springs 9 interposed between an inner surface of head 1 and an end washer 10 of the valve. The communication of the two exhaust conduits 6 with the combustion chamber is controlled by two valves 70, also conventional type, to which there are associated springs 9 biasing towards the closed position.

The opening of each intake valve 7 is controlled, in the way which will be described in the following, by a camshaft 11 rotatebly mounted around an axis 12 within supports of the head 1, and comprising a plurality of cams 14 for actuating the intake valves 7.

Each cam 14 which controls a intake valve 7 cooperates with a disk 15 of a tappet 16 slideably mounted along an axis 17 which, in the case of the example illustrated in the above-mentioned prior document, is directed substantially at 90° with respect to the axis of valve 7. Disk 15 is biased against cam 14 by a spring associated thereto. The tappet 16 constitutes a pumping piston slideably mounted within a bush 18 carried by a body 19 of a pre-assembled unit 20, incorporating all the electric and hydraulic devices associated to the actuation of the intake valves, according to what is described in detail in the following.

The pumping piston 16 is able to apply a force to the stem 8 of valve 7, so as to cause opening of the latter against the action of the springs 9, by means of fluid under pressure (preferably oil coming from the lubrication circuit of the engine) which is present in a pressure chamber C to which the pumping piston 16 is facing, as well as by means of a piston 21 slideably mounted in a cylindrical body constituted by a bush 22 which is also carried by the body 19 of the sub-unit 20.

Also in the known solution shown in FIG. 1, the chamber of fluid under pressure C associated to each intake valve 7 can be put in communication with a discharge channel 23 through a solenoid valve 24. The solenoid valve 24, which can be of any known type, adapted for the function illustrated herein, is controlled by electronic control means, diagrammatically designated by 25, as a function of signals S representative of parameters of operation of the engine, such as the accelerator position and the engine number of revolutions.

When the solenoid valve 24 is opened, chamber C is in communication with channel 23, so that the fluid under pressure present in chamber C flows in this channel and an uncoupling is obtained of cam 14 and the associated tappet 16 with respect to the intake valve 7, which therefore returns rapidly to its closed position under the action of the return springs 9. By controlling the communication between chamber C and the discharge channel 23 it is therefore possible to vary at will the open time and lift of each intake valve 7.

The discharge channels 23 of the various solenoid valves 24 all communicate with a common longitudinal channel 26 which also communicates with pressure accumulators 27, only one of which is visible in FIG. 1.

All the tappets 16 with the associated bushes 18, pistons 21 with associated bushes 22, solenoid valves 24 and corresponding channels 23,26 are carried and formed in the above-mentioned body 19 of the pre-assembled unit 20, to advantage of quickness and easiness of assembling of the engine.

The exhaust valves 70 associated to each cylinder are controlled, in the embodiment shown in FIG. 1, in a conventional way, by a respective camshaft 28, through respective tappets 29, even if in principle it is not excluded, in the case of the above-mentioned prior document, an application of the hydraulic actuation system also to the control of the exhaust valves.

Also with reference to FIG. 1, the chamber with variable volume defined inside bush 22 and facing towards piston 21 (which in FIG. 1 is shown in its condition of minimum volume, since piston 21 is in its top end position) communicates with the chamber of fluid under pressure C through an aperture 30 formed in an end wall of bush 22. This aperture 30 is engaged by an end nose 31 of the piston 21 so as to provide a hydraulic breaking of the movement of valve 7 in the closing phase, when the valve is approximate to the closed position, since the oil present in the chamber with variable volume is caused to flow into the chamber of fluid under pressure C through the play between the end nose 31 and that the wall of aperture 30 which is engaged the by the nose. In addition to the communication constituted by aperture 30, the chamber of fluid under pressure C and the chamber with variable volume of piston 21 communicate with each other through inner passages formed in the body of piston 21 and controlled by a one-way valve 32 which enables a flow of fluid only from the pressure chamber C towards the chamber with variable volume of piston 21.

During normal operation of the known engine shown in FIG. 1, when the solenoid valve 24 is closed and excludes a communication of the chamber of fluid under pressure C with the discharge channel 23, the oil present in this chamber transmits the movement of the pumping piston 18, imparted by cam 14, to piston 21 which controls the opening of valve 7. In the starting stage of the opening movement of the valve, the fluid coming from chamber C reaches the chamber with variable volume of piston 21 flowing through the one-way valve 32 and further passages which communicate the inner cavity of piston 21, which has a tubular shape, to the chamber with variable volume. After a first displacement of piston 21, nose 31 comes out from aperture 30, so that the fluid coming from chamber C may flow directly into the chamber with variable volume through the aperture 30, which is now free.

In the reverse movements of closing of the valve, as indicated, during the final stage the nose 31 enters into aperture 30 causing an hydraulic breaking of the valve, so as to avoid collisions of the body of the valve against its seat, for example following an opening of the solenoid valve 24 which causes immediate return of valve 7 to the closed position.

In the described system, when the solenoid valve 24 is activated (i.e. when it is closed), the engine valve follows the movement of the cam (full lift). An early closing of the valve can be used by deactivating (i.e. by opening) the solenoid valve 24, so as to empty the hydraulic chamber and obtain closing of the engine valve under the action of the respective return springs. Similarly, a delayed opening of a valve can be used by a delayed activation of the solenoid valve (i.e. by delayed closing thereof) while the combination of a delayed opening and an early closing of the valve can be used with activation and a deactivation of the solenoid valve during the pushing action of the associated cam. According to an alternative strategy, corresponding to the teaching of patent application EP 1 726 790 A1 of the same Applicant, each intake valve can be controlled in a "multi-lift" mode, i.e. with two or more repeated opening and closing "sub-cycles".

In each sub-cycle, the intake valve is opened and then closed completely. The electronic control unit is therefore able to obtain a variation of the opening time and/or closing time and/or lift of the intake valve, as a function of one or more operational parameters of the engine. In this manner, a maximum efficiency of the engine can be obtained, with the minimum fuel consumption, at any operation condition.

FIG. 2 of the annexed drawings corresponds to FIG. 6 of EP 1 674 673 and shows the diagram of the actuation system for the two intake valves associated to each cylinder, in a conventional multi-air system. This figure shows two intake valves 7 associated to a same cylinder of an internal combustion engine, which are controlled by a single pumping piston 16 which on its turn is driven by a single cam of the camshaft of the engine (not shown) which acts against its disk 15. This figure does not show the return springs 9 (see FIG. 1) which are associated to valves 7 and tend to bring them to their respective closed positions.

As shown, in the conventional system of FIG. 2, a single pumping piston 16 controls the two valves 7 through a single pressure chamber C, whose communication with the discharge is controlled by a single solenoid valve 24 and which is hydraulically in communication with both the variable volume chambers C1, C2 towards which the pistons 21 for controlling the two valves are facing.

This solution has clear advantages in terms of a lower bulk within the cylinder head, and reduced cost and lower complexity of the system, whit respect to a solution which has one cam and one solenoid valve for each intake valve of each cylinder.

The system of FIG. 2 is able to operate efficiently and reliably particularly in the case in which the volumes of the hydraulic chambers are relatively small. This possibility is offered by adopting hydraulic tappets 400 outside of the bushes 22, according to what has been illustrated in detail for example in document EP 1 674 673 B1 of the applicant. In this manner, the bushes 22 can have a minor diameter which can be selected as small as desired.

FIG. 3 of the annexed drawings is a diagrammatic illustration of the system shown in FIG. 2, in which it becomes clear that both of the intake valves 7 associated to each cylinder of the engine have their actuators 21 permanent in communication with the pressure chamber C, which on its turn can be either insulated or connected with respect to the discharge channel 23 through the single solenoid valve 24.

The solution shown in FIGS. 2, 3 provides clear advantages in terms of simplicity and reduced cost of manufacture, and also in terms of reduction of dimensions, with respect to the solution shown for example in document EP 0 803 642 B1, which has two solenoid valves for controlling the two intake valves of each cylinder separately.

On the other end, the solution with a single solenoid valve for each cylinder eliminates the possibility of differentiating the control of the intake valves of each cylinder. This differentiation is instead desired: in the case of the diesel engines in which each cylinder is provided with two intake valves associated to respective intake conduits having different shapes, for the purpose of generating different movements of the airflow introduced into the cylinder (see for example FIG. 5 of EP 1 508 676 B1). Typically in these engines the two intake conduits of each cylinder are configured for optimising a "tumbled-like flow and a swirl-like flow inside the cylinder", respectively, these movements being very important for a best distribution of the air charge inside the cylinder, from which the possibility of reducing polluting emissions at the exhaust is substantially dependent.

In spark-ignition engines, this differentiation is desired at low loads of the engine, both for optimising the air flux coefficients through the intake valves and for reducing the pumping cycle accordingly and also for optimising the field of motion of the air inside the cylinder during the intake stage.

As indicated, in the multi-year systems with a single solenoid valve for each cylinder, there is no possibility to control the two intake valves of each cylinder independently. It would be desirable instead two increase each time the fraction of the air charge which is introduced with a tumble motion and the refraction of the air charge which is introduced with a swear motion, depending upon the operative conditions of the engine (number of revolutions, load, cold start, etc.) and depending upon the configuration of the engine (fuel direct injection, high compression ratio, intake conduits adapted to favour feeling of the cylinder rather than turbulence, etc.).

Similarly, in a spark-ignition engine, particularly when the engine is operating at partial loads or at idle, the problem is posed of introducing a small air charge with sufficient kinetic energy for favouring an optimal field of motion for the combustion inside the cylinder. In these operating conditions, it would be therefore preferable that the entire air masses is introduced by only one of the two intake valves for reducing the dissipation losses in the passage through the valve itself. Advantageously this air masses is preferably to be introduced with a lift variation of the valve which is greater than the conventional one and also when the piston is already moving so as to further increased turbulence. In other words, for a given mass of air which must be introduced into the combustion chamber and for a given pressure within the intake manifold and for a given vacuum generated by the movement of the piston within the combustion chamber, there are lower dissipation losses (and then hire kinetic energy) for the mass of air introduced by a single intake valve which opens with a lift of $2h$ with respect to the case in which the same mass of air is introduced by two intake valves each having a lift of h. If the $2h$ lift becomes higher than the threshold determined by the configuration of the cylinder head, it is possible to provide a discharge port in the hydraulic circuit which controls said valve, said discharged port being communicated to a low-pressure environment, not shown in the drawing, which, ones the valve lift has reached a predetermined value, maintains this lift constant up to when this discharge port is closed.

In document EP 2 801 706 A1 of the same applicant there is shown an internal combustion engine of the type indicated at the beginning of the present invention and further characterized in that the solenoid valve associated to each cylinder is a three-way three-position the solenoid valve comprising an inlet which is permanently communicating with said chamber of fluid under pressure and with the actuator of the first intake valve, and the two outlets respectably communicating with the actuator of the second intake valve and would said discharge channel. In this solution, the solenoid valve has the following three operative positions:

a first position, in which the inlet communicates with both of the outlets, so that the actuators of both the intake valves are put to discharge, and the intake valves are both held closed by their returns springs, a second position, in which the inlet communicates only with the outlet connected to the actuator of the second intake valve and does not communicate instead with the outlet connected to the discharge channel, so that the pressure chamber is insulated with respect to the discharge channel, the actuators of both the intake valves communicate with the pressure chamber and the intake valves are therefore both active, and a third position, in which the inlet does not communicate with any of the two outlets, so that said pressure chamber is insulated with respect to the discharge channel and said first intake valve is active, whereas the second intake valve is insulated with respect to the pressure chamber.

The control valve associated to each cylinder of the engine can have a solenoid-operated electric actuator or any other type of electric or electromagnetic actuator.

With reference to the diagrammatic illustrations of FIGS. 4-6, the two intake valves associated to each cylinder of the engine (which are designated by references 7A, 7B in FIGS. 4-6) are not both permanently connected to the chamber of fluid under pressure C. In the case of this solution, only one of the two intake valves (the valve which in the drawings is designated by reference 7B) has its hydraulic actuator 21 permanently communicating to the chamber of fluid under pressure C. Furthermore, the two-position two-way solenoid valve 24 is replaced by a three-way three-position solenoid valve, having an inlet "i" which permanently communicates to the chamber of fluid under pressure C, and to the hydraulic actuator of the intake valves 7B, and two outlets u1, u2. Outlet u1 is permanently communicating with the hydraulic actuator 21 of the intake valve 7A, whereas the outlet u2 is permanently connected to the discharge channel 23 and the hydraulic accumulator 270.

FIG. 4 shows the solenoid valve in its first operative position P1, corresponding to a de-energized condition of its solenoid. In this position, inlet i is in communication with both outlets u1, u2, so that the hydraulic actuators of both intake valves 7A, 7B, as well the chamber of fluid under pressure C are in communication with the discharge channel 23 and the accumulator 270, so that both the valves are uncoupled with respect to the tappet and held closed by the respective return springs.

FIG. 5 shows a second position of the solenoid valve, corresponding to a first energization level of the solenoid, in which inlet i is in communication with outlet u1, whereas the communication between inlet u and outlet u2 is interrupted. Therefore, in this condition the actuators of both the intake valves 7A,7B are in communication with the pressure chamber C and the latter is insulated with respect to the discharge channel 23, so that both the intake valves are active and sensitive to the movement of the respective tappet.

FIG. 6 shows the third operative position of the solenoid valve, corresponding to a second energization level, higher than the first energization level, in which the inlet i is insulated with respect to both outlets u1,u2 so that the chamber of fluid under pressure C is insulated with respect to the discharge channel 23 and the intake valve 7B is therefore active and sensitive to the movement of the respective tappet, whereas in this condition the actuator of the intake valve 7A is insulated both with respect to the chamber of fluid under pressure (so that it is uncoupled with respect to the movements of the respective tappet) and with respect to the discharge channel 23.

Therefore, as shown, it is possible to render the two intake valves 7A, 7B associated to each cylinder of the engine both sensitive to the movement of the respective tappet, but it is also possible to uncouple both of them from the respective tappet by causing them to be held closed by the respective return springs, and it is also possible to uncouple only the intake valve 7A from the respective tappet, while leaving only intake valve 7B active.

When an opening command for the two intake valves 7A, 7B ceases, the solenoid valve is brought again to position P1 to enable the pumping piston 16 to draw a flow of oil from volume 270 towards volume C.

FIGS. 7, 8 of the annexed drawings show lift diagrams of the intake valves and the corresponding diagrams of the current supplying the solenoid of the solenoid valve, when the solenoid valve is used by shifting it only between position P1 and position P2, that is between the conditions respectably shown in FIG. 4 and FIG. 5. In the case of an operation of this type, the two intake valves associated to each cylinder of the engine are driven in ways identical to each other, that is similarly to what takes place in a conventional system with solenoid valves having only two positions, as illustrated in FIG. 3.

The diagram at top left of FIG. 7 shows a "full lift" mode in which both the intake valves of each cylinder of the engine are controlled in a conventional way by causing each of them to take the full-lift which is driven by the respective cam over the engine camshaft. The diagram shows lift H of both valves as a function of the engine crank angle α. The portion at bottom left of FIG. 7 shows a diagram of the current supplying the solenoid of the solenoid valve in the above mentioned full-lift mode. In order to enable opening of both the intake valves associated to each engine cylinder during the active stage of the respective tappet, in which the tappet tends to open the valves, the solenoid valve is brought from position P1 to position P2 (condition shown in FIG. 5), in which both of the valves 7A, 7B are coupled with the tappet. This is obtained by supplying the solenoid with a first current level I. It is to be observed that the portion at bottom left of FIG. 7 shows, by way of example, a current diagram in which, according to a technique known per se, the solenoid of the solenoid valve is supplied initially with a peak current I1 peak and right thereafter with a hold current I1 hold throughout the entire field of rotation of the crankshaft in which the tappet tends to open the intake valves. However, it is possible to provide for a constant current level for each of positions P2 and P3 of the solenoid valve.

The portion at top right of FIG. 7 shows an "early closing" mode of conventional type, in which both the intake valves associated to each cylinder of the engine are closed simultaneously in advance with respect to the end of the active phase of the respective tappet, so that the lift diagram of both valves is that shown by undotted line that in the portion at top right of FIG. 7, rather than that illustrated by dotted line (which is coincident with the previously discussed full-lift case). The portion at bottom right of FIG. 7 shows the corresponding diagram of the current for supplying the solenoid. As shown, in this case the solenoid valve is brought to the position P2 as in the "full-lift" case, but then the current supplying the solenoid is brought to zero in advance with respect to the end of the active phase of the tappet, so that the solenoid valve returns to position P1 and both the intake valves associated to each cylinder return to their closed condition in advance with respect to the end of the active phase of the respective tappet.

FIG. 8 of the annexed drawings shows two other modes of operation of known type, in which both the intake valves associated to each cylinder are controlled so that the variation of movements of each valve is identical to the other by shifting the solenoid valve which controls the intake valves only between positions P1 and P2: therefore, by undotted line there is shown the movement of both valves. The portion at top left of FIG. 8 shows the lift of both the intake valves (undotted diagram) in a "late opening" mode in which the solenoid of the solenoid valve is supplied with a current at level I1 starting from an instant of time subsequent to the beginning of the active phase of the tappet. Therefore, each of the two intake valves does not have a full-lift (shown by dotted line in the section at top left of FIG. 8) but rather a reduced lift (shown by undotted line). Since in this case the intake valves of each cylinder are coupled to the respective cam after a given time from the beginning of the active phase of the tappet, the two valves open with a reduced lift, since they will feel only the remaining portion of the profile of the respective actuating cam, which brings the consequence of that the valves return to their closed positions in advance with respect to the full-lift case.

More in detail, the cam is characterised by a profile 14 such that it moves piston 17 of the pumping cylinder 16 rigidly connected their two according to $h=h(\theta)$ law where h is the axial displacement of piston 17 and $\theta$ is the angular rotation of the shaft on which cam 11 is connected. Depending on the angular speed of the cam, therefore, the piston is moved to according to a $h=(\theta, t)$ law.

Independently from the angular speed of the cam, at each revolution of the camshaft the piston 17 will always move at the same volume of oil V st max=H max*area st, where H max is the maximum travel of the piston imparted by the profile of the cam (all losses are herein neglected which depend from losses in feeling the piston chamber, leakages, or non-perfect coupling between cam and piston, the oil being supposed the to be incompressible). The maximum displacements of the intake valves depends from the volume of oil which is pumped inside element 21: the case of full lift of both the intake valves corresponds to the case in which the entire volume V st max is used to move the above mentioned valves, which therefore reach their maximum lift S max. If solenoid valve 24 is shifted when the piston is moving, so as to put a certain volume of oil to discharge, the travel S of the intake valves will be lower than S max and the difference S max-S will be proportional to the volume which is passed through solenoid valve 24. Therefore it is understood why, in the diagram at the left of FIG. 8, the profile of the intake valves does not reach the maximum lift S max.

Also in the case of FIG. 8, the current diagrams relate to an example in which the current level I1 is provided by at first reaching a peak level I1 peak and then bringing the current to a lower level I1 hold. However, it is clearly apparent that also in this case simplified current profiles may be adopted, without a starting peak level.

The portion at top right of FIG. 8 shows the lift diagram of both the intake valves associated to each cylinder of the engine in a "multi-lift" mode in which both intake valves do not have the full lift profile shown with dotted line, but instead they are opened and closed completely more than one time during the active phase of the respective tappet (undotted line diagram). This mode of operation is obtained with the current profile shown in the section at bottom right of FIG. 8, where it is shown that the solenoid of the solenoid valve is supplied at current level I1 (in the case of the illustrated example through a first peak value I1 peak and then with a lower hold value I1 hold) and then is again completely de-energized, to be again energized at level I1 and then again de-energized, both the above indicated cycles being carried out within the field of rotation of the engine crankshaft corresponding to the active phase of the tappet which controls the intake valves. In this manner, the solenoid valve is brought initially to position P2, so that both the valves start to open, but then is brought again to position P1, so as to close completely both valves. A new energization of the solenoid at level I1 causes a new displacement of the solenoid valve to position P2 and then a new opening of both valves, which then are closed again definitely as soon as the solenoid is de-energised for the second time. In this manner, within the active phase of tappet which controls the intake valves, both intake valves are opened and closed completely two or more times.

The modes of operation shown in FIGS. 7, 8 which have been described in the foregoing are conventional modes of operation in Multi-air (registered trademark) systems, since in this case three positions' solenoid valves is used as a solenoid valve with two only positions, similarly to conventional Multi-air systems.

The diagrams of FIG. 9 of the annexed drawings show additional modes of operation of the engine which have been already illustrated in EP 2 801 706 A1. In this additional control modes, the two intake valves associated to each cylinder of the engine are controlled in a differentiated manner. In the above mentioned diagrams and in the descriptions which follows, the lift diagrams of the intake valves 7A, 7B, previously discussed with reference to FIGS. 4, 6 are designated simply as "valve A" and "valve B" respectively and are therefore differentiated.

In the top portion of FIG. 9, the undotted line diagrams show lift profiles of the valve B, whereas the dotted line diagrams show lift profiles of valve A respectively in two different modes of operation.

The left section of FIG. 9 shows a mode of operation in which valve B is controlled in a full lift mode, i.e. so as to cause it to have a conventional lift cycle during the active phase of the respective tappet. Differently from valve B, valve A is controlled in a "delayed opening" mode in which valve A is opened with a delay with respect to valve B. This mode of operation is obtained by supplying the solenoid of the solenoid valve according to the current profile shown in the left section of the low portion of FIG. 9. As shown, the solenoid is supplied initially at a current level I2 so as to bring the solenoid valve from position P1 to position P3 (condition shown in FIG. 6). The example shown relates to the case in which the current level I2 is obtained by adopting at first briefly a peak level I2 peak and then lowering the current to a hold level I2 hold. As indicated many times above, it will be also possible to provide simplified current diagrams, with a constant current level for which of positions P2 and P3. This possibility applies also to all the other modes of operation described herein.

Also with reference to the top left portion of FIG. 9, with regard to the mode of operation of the solenoid valve 24, it is understood that the shift from position P1 to position P3 takes place by passing for a very small time through position P2: however, from the point of view of the intake valves, this transition is not appreciated and therefore they see the solenoid valve 24 to shift directly from position P1 to position P3.

Also with reference to the left section of the lower part of FIG. 9, during the active phase of the tappet, the supplied current of the solenoid is lowered at a level P1 hold which is held throughout the remaining part of the active phase of a tappet. When the level of the supplied current passes from I2 to I1, the solenoid valve moves from position P3 shown in FIG. 6 to position P2 shown in FIG. 5. Therefore, in the case of the mode of operation shown in the left part of FIG. 9, the solenoid valve is initially brought to position P3 (FIG. 6) so that only valve B is coupled to the respective tappet and only valve B is opened according to the conventional lift profile. In the first part of the active phase of the tappet, therefore, valve A remains closed. In that time instant in which the current supplying the solenoid of the solenoid valve is brought from level I2 to level I1, the solenoid valve shifts from position P3 shown in FIG. 6 to position P2 shown in FIG. 5 so as to couple both valves A, B to the respective tappet. Therefore, starting from this instant of time, also valve A is opened. As a result of this, in this case the opening of valve A takes place with a delay with respect to the opening of valve B. The valve A feels the respective tappet throughout the remaining part of the active phase of the tappet, so that it has a lift diagram corresponding to the dotted line in the left section of the top portion of FIG. 9 and is closed together with valve B.

The right section of the top portion of FIG. 9 shows a further control mode for the intake valves. Also in this case, valve B has a conventional lift cycle, since it is coupled to the respective tappet throughout the entire duration of the active phase of the tappet. Instead valve A has a lift profile shown by dotted line in the right section of the top portion of FIG. 9. This mode of operation is obtained by supplying the solenoid of the control valve according to a current profile which is shown in the right section of the bottom portion of FIG. 9. As shown, at the start of the active phase of the tappet, the solenoid of the control valve is supplied with a current level I1 (which as usual in the case of the illustrated example has a starting peak level and a subsequent maintenance level). During the active phase of the tappet, the supply current is then brought to the higher level I2 (again, in this specific example, a first peak level and then a maintenance level are provided). Also with reference to the right section of FIG. 9, the supply current of the solenoid is then brought to zero at a time subsequent to the end of the active phase of the tappet. As shown, in the case of this control mode, the valve B is controlled in a "full lift" mode, whereas valve A is controlled in a "delayed closing" mode. At the start of the active phase of the tappet, the solenoid valve is supplied at level I1 and therefore is in the position P2 shown in FIG. 2. In this condition, both the intake valves A and B are opened, as shown in diagrams in the right section of FIG. 9. Subsequently, during the active phase of the tappet, the supply current of the solenoid is brought to level I2, so that the solenoid valve shifts to position P3, shown in FIG. 6, in which valve B remains coupled to the tappet, whereas valve A is insulated. In this condition, therefore, valve A remains in the opened position in which it is located at the moment when the solenoid valve is brought to position P3. As shown in the right section of FIG. 9, the current level I2 is maintained also after the end of the active phase of the tappet, so that, in this control mode, valve A remains locked in said opened position also after the end of the active phase of the tappet. Valve A returns to the closed condition only when the supply current of the solenoid of the control valve is brought again to zero, so that the solenoid valve returns to position P1.

Therefore, in the mode of operation described in the right sections of FIG. 9, one of the two intake valves is controlled in a conventional way, whereas the other intake valve is partially opened and then maintained in this partially opened position also after the end of the active phase of the respective tappet. The duration of the phase in which the intake valve A is locked in said partially opened position can be determined at will, since it is a function of the selected current profile. If desired, due to the above-mentioned measure, valve A can remain locked in the partially opened position through any range of rotation of the crankshaft for each revolution of the crankshaft, if necessary also through 360° (naturally by selecting a lift level such that valve A does not come in contact with the piston when the latter is at its top position in the cylinder, or by adopting for the piston geometry a geometrical configuration which avoids this contact; furthermore, the movement of valve A when the solenoid valve 24 is at position P3 is affected by leakages of the solenoid valve 24 itself).

The Invention

In the present invention various embodiments of an electro-hydraulic actuation system for the intake valves are advantageously used in an engine in which each cylinder is provided with two intake valves respectively associated to two intake conduits which are configured for generating a tumble motion and a swirl motion of the airflow introduced into the cylinder.

FIG. 10 of the annexed drawings shows a cylinder head 1 including an intake conduit 4 for introducing an airflow A into a cylinder 2. FIG. 10 shows a characteristic tumble flow, consisting in a joint rotation, in a single directional rotation, of the entire airflow around a theoretical axis A1 which is orthogonal to the axis of cylinder C1.

For the purpose of obtaining a tumble motion of the type diagrammatically illustrated in FIG. 10, conduit 4 is configured in any known way adapted to convey the entire airflow coming out from conduit 4 mainly on one side of the intake valve 7 associated to conduit 4, in particular on the side proximate to the symmetry axis of the cylinder, so as to generate a primary anti-clockwise vortex, as shown in FIG. 10. FIG. 11 shows an example of configuration of the intake conduit 4 adapted to obtain a more accentuated tumble effect. As shown in this figure, conduit 4 has an asymmetrical configuration, with a lateral inclined wall 4A (a so-called "masking") which is shaped so as to define a narrow cross-section 4B of a conduit 4 which conveys the airflow mainly towards a localized area 4C arranged on one side of the mushroom-shaped head of the intake valve 7. In this manner, a substantial portion of the airflow coming out from conduit 4 is directed according to arrow A of FIG. 11, so as to give rise, due to the impact against the wall of cylinder 2, to a tumble vortex of the type diagrammatically shown in FIG. 10. It is understood that, both with reference to FIG. 10 and with reference to FIG. 11, a flow of air entering through the portion of the intake valve close to the wall of the cylinder is possible, but this flow is characterized by a minor intensity, so that it does not affect the formation of the primary vortex significantly.

FIG. 12 diagrammatically shows an airflow A which enters into cylinder 1 with a swirl motion. The intake conduit 4B is shaped accordingly. The swirl motion is substantially a motion in the form of a helical spiral, around axis C1 of cylinder 2.

FIGS. 13A, 14 and 16 show three different embodiments of the invention. In all the embodiments each cylinder is provided with two intake valves. A first intake valve, which is designated by VT in FIGS. 13A, 14 and 16, is associated to an intake conduit configured in any known way which is adapted to generate a tumble motion of the airflow introduced into the cylinder.

A second intake valve, which in FIGS. 13A, 14 and 16 is designated by VS, is associated to an intake conduit shaped and arranged so as to generate a swirl motion of the airflow introduced into the cylinder.

In all the embodiments of the present invention which are shown herein, the electronic controller 25 of the system for variable actuation of the intake valves is configured and programmed so that only one of the two intake valves of each cylinder is opened, even only partially with respect to the maximum lift which is possible for the valve, in a condition of reduced operation of the engine, below a predetermined load of the engine and/or below a predetermined speed of rotation of the engine, whereas both the intake valves are at least partially opened in the remaining conditions of operation of the engine.

According to an important feature of the present invention, the electronic controller 25 is programmed so that the intake valve which is the only valve to be opened in the above-mentioned condition of reduced operation of the engine is the intake valve VT, associated to the intake conduit which is configured for generating a tumble motion. Furthermore, according to the present invention, in certain conditions of operation of the engine, such as at low loads, and depending from the configuration of the engine, for example depending from the presence of an injector for direct injection or the presence of intake conduits which are optimized for increasing cylinder filling, it may be advantageous to delay opening of the valve VT, when this valve is opened, whereas valve VS remains closed, so as to exploit the speed of the piston for further increasing the intensity of the tumble motion which is generated in the combustion chamber. For example, it may be advantageous to open valve VT when the piston of the engine has covered about one third of its intake stroke.

Studies and tests conducted by the Applicant have shown that at low loads and low speeds of revolution of the engine it is indeed very advantageous to impart only a tumble motion to the airflow which enters into each cylinder of the engine. In this manner it is indeed possible to increase the speed of the combustion and accordingly to improve the stability of the combustion, so as to improve the characteristics of the engine, mainly with reference to the obtained power. At the same time, the absence of a swirl motion at low loads and/or low speeds of revolution does not give rise to any drawbacks, since it is above all in conditions of high loads and/or high speeds of revolution of the engine which the swirl motion becomes necessary for mitigating the drawback due to impingement of the liquid particles, coming from the fuel jet at the output of the injector, which are not yet evaporated, against the wall of the cylinder, and also because the swirl component, particularly for engines with a high compression ratio, is subject to a lower dissipation while the compression stage of the piston is in progress: in this manner it is possible to have a greater conservation of the momentum of the air/fuel charge which is necessary for a stable combustion.

The adoption of an electro-hydraulic actuation system for the intake valves of the engine according to the Multiair technology results to be particularly advantageous in the case of the present invention since it enables the second intake valve VS associated to the intake conduit which is configured for generating a swirl motion of the airflow introduced into the cylinder, to be opened only partially, as will be shown in detail in the following.

First Embodiment of the Invention

FIGS. 13A, 13B relate to a first embodiment of the present invention in which the system for variable actuation of the intake valves is of the known type shown in document EP 2 801 706 A1 of the same Applicant, corresponding also to FIGS. 4-6 which are annexed hereto.

According to what has been already indicated in the foregoing, the three-way three-position solenoid valve 24 can be controlled according to three different current profiles (shown in the lower part of FIG. 13B) for generating the modes of operation which are shown in the diagrams of the upper part of FIG. 13B.

In a first mode of operation, corresponding to the above-mentioned condition of reduced operation of the engine (below a determined value of the engine load and/or below a determined value of the speed of rotation of the engine) at the start of the lift cycle of the respective actuating cam, the solenoid valve 24 is brought from state 1 to state 3 so that the intake valve VT has a lift cycle having a profile (or law of motion) higher with respect to that which the same valve VT would have in the case of a standard opening in synchronism with valve VS (FIG. 7), whereas the intake valve VS remains constantly closed.

In this manner, in this condition of reduced operation of the engine, the air enters into the cylinder only through the first intake conduit, giving rise to a tumble motion. The diagram shown at the centre in FIG. 13B refers to a mode of operation in which both the intake valves VT and VS are actuated at the same opening start time, but with different closing times. At the time in which the lift cycle of the respective cam begins, the three position solenoid valve 24 is shifted from position 1 to position 2 so that initially both the intake valves start their lift cycle. However, in an intermediate phase of the active lift cycle of the cam, the solenoid valve is shifted from position 2 to position 3 (see also the corresponding current signal in the lower part of FIG. 13B) so that the intake valve VT moves according to a law motion which depends from the quantity of oil which the pumping piston 16 can still displace, this law of motion causing any how a higher lift with respect to the standard lift of FIG. 7, whereas the intake valve VS reaches a partial lift level after which it is closed with a delay with respect to the end of the active lift cycle of the cam.

The right part of FIG. 13B shows a late opening mode of operation in which at the start of the active cycle of the cam the solenoid valve is shifted from position 1 to position 3, so that only the intake valve VT performs its lift cycle, whereas in a subsequent stage of the lift cycle of the cam, the solenoid valve 24 is shifted from position 3 to position 2 to generate a partial undelayed lift of the intake valve VS: in this mode, the lift profile of valve VT is identical to that of the case shown on the left in FIG. 13B, up to the moment of shifting from position 3 to position 2.

The above mentioned modes of operation can be actuated in different conditions of operation of the engine, so that in the above mentioned condition of the reduced operation only the intake valve VT is opened, generating thereby only a tumble motion of the airflow introduced into the cylinder. In particle, in the case of a particularly reduced engine loads and relatively large combustion chambers, it could be preferable to open even only partially the above mentioned valve VT. In the remaining conditions of operation of the engine, one of the two remaining modes of operation which have been shown above can be actuated, in order to obtain, in addition to the tumble motion, also a swirl motion, but to an extent which is proportional to the partial lift level of the intake valve VS. In this manner, it is possible to obtain a desired combination of the tumble component and the swirl component with a significant advantage in terms of increase of the speed of combustion within the cylinder and in terms of homogeneity of the air/fuel mixture, thus avoiding at the same time all the drawbacks of the solutions according to the prior art.

Second Embodiment of the Invention

FIG. 14 shows a diagram of the system for variable actuation of the intake valves, which can be used in a second embodiment of the present invention.

Differently from the system shown in FIG. 13A, the system of FIG. 14 was never proposed previously by the applicant and therefore constitutes, also taken per se, a new development in the multi-air technology developed by the applicant.

In this embodiment the system for variable actuation of the intake valves VT, VS comprises, similarly to the known systems which have been described in the foregoing, a single pumping cylinder 16 actuated by a respective cam of the camshaft of the engine, for controlling the operation of the two intake valves of each cylinder. In this case, the communication of the hydraulic actuators 21 and the two intake valves VT, VS with the discharge channel 270 is controlled by means of two electrically actuated control valves 24A, 24B, both of an on/off two position type, arranged in series with each other along a hydraulic line L which communicates the pressure chamber C to the discharged environment 270.

The control valves 24A, 24B can be two solenoid valves of any known type, for example two normally opened solenoid valves which are shifted to a closed position by energizing a respective solenoid.

Also with reference to FIG. 14, the hydraulic line L includes, starting from pressure chamber C towards the discharge channel 270, a first branch-off point D1, connected to the hydraulic actuator 21 of the intake valve VT, associated to the intake conduit which is configured for generating a tumble motion, and a second branch-off point D2 connected to the hydraulic actuator 21 of the intake valve VS associated to the intake conduit configured for generating a swirl motion.

A first solenoid valve 24A is arranged between the second branch-off point D2 and the discharge channel 270, so that when the solenoid valve 24A is closed, the communication is interrupted of the hydraulic actuator 21 of valve VT both with the discharged environment 270 and with the hydraulic actuator 21 of valve VS.

The second solenoid valve 24B is arranged along the line L between the branch-off point D2 and the discharge 270. Therefore, when the solenoid valve 24A is closed, the actuator 21 of the intake valve VT is always in communication with the pressure chamber C, whereas the communication between actuator 21 of intake valve VT and the discharge channel 270 is anyway interrupted, independently from the condition of operation of solenoid valve 24B; in these conditions the actuator 21 of intake valve VS is no longer in communication with the pressure chamber C, independently from the condition of operation of solenoid valve 24B. When instead the solenoid valve 24A is opened and the solenoid valve 24B is closed, both the intake valves VT and VS are in communication with the pressure chamber C and are isolated from the discharge channel 270.

Figure 15:
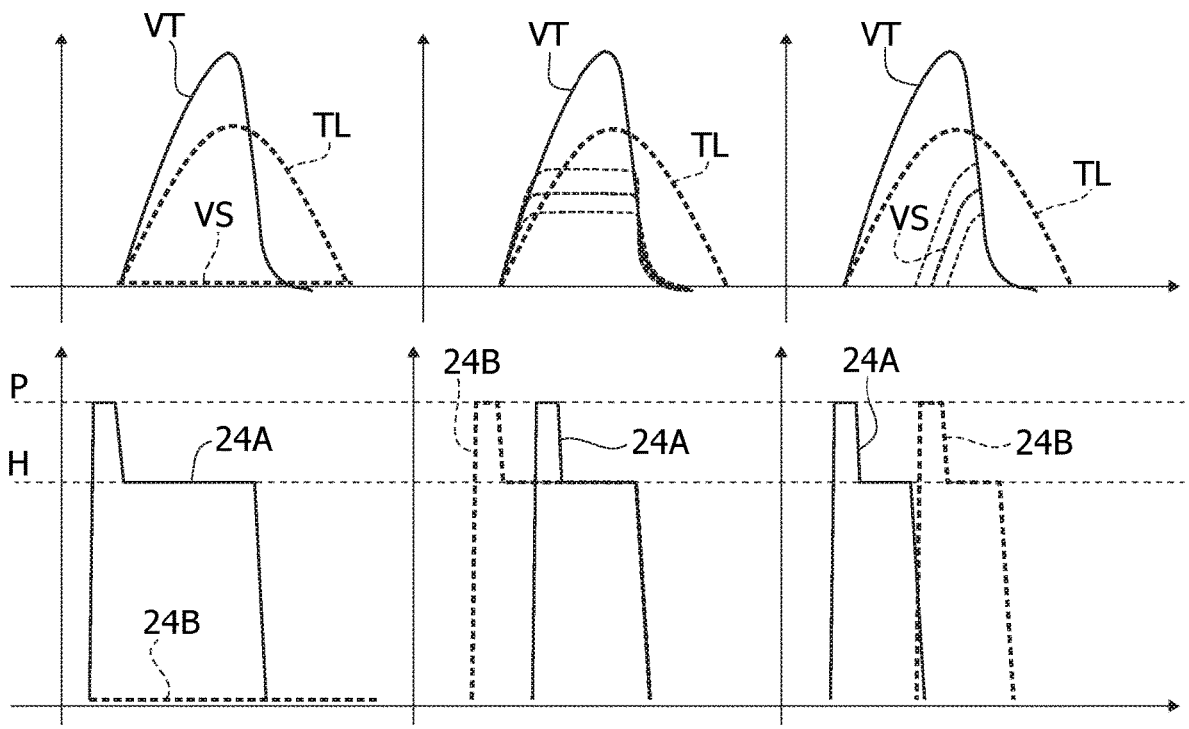

FIG. 15 shows three different diagrams corresponding to three different modes of operation which can be activated whit the use of the actuation system of FIG. 14, depending upon the conditions of operation of the engine. The lower part of FIG. 15 shows the corresponding current profiles for supplying the two solenoid valves 24A, 24B.

In FIG. 15, in addition to the lift diagrams of the intake valves VT and VS there is also shown the standard lift diagram TL, corresponding to the law of motion which the two valves VT and VS would have if the solenoid valve 24B were always closed and the solenoid valve 24A were always opened, in which case both the intake valves VT and VS would follow the profile of the cam, except for any negligible hydraulic losses.

The same remark applies to the configuration of FIG. 13A, where the lift profile TL corresponds to that which would be obtained if solenoid valve 24 where always in the operative condition 3. In phases in which only the intake valve VT is actuated (solenoid valve 24A always closed) all the fluid under pressure displaced by the pumping piston would be transferred only to the actuator 21 of the intake valve VT. Therefore in this condition the intake valve VT would tend to have a maximum lift and in general a lift profile corresponding to the double of the standard lift cycle in which the fluid displaced by the pumping piston is used for opening both the intake valves. For manufacturing reasons, it is not admissible that the maximum lift of the one intake valve (or of an exhaust valve) overcomes a given value (such as 12 mm) so that according to the invention it is provided that the actuator 21 of the intake valve VT has not able in any case to move the valve beyond a predetermined threshold lift position. For this purpose, with reference to FIG. 14, the hydraulic actuator 21 of the intake valve VT associated to the intake conduit which is configured for generating a tumble motion is preferably provided with a discharge outlet which through a line L1 puts the chamber under pressure of actuator 21 to discharge when the movable member of the actuator is displaced through a length greater than a predetermined value. In this manner, it is prevented that the first intake valve VT has a lift greater than a maximum predetermined limit. When the valve reaches this limit value, its lift profile remains constant as long as the pumping piston 16 does not reverse its direction of movement, which induces a reduction of pressure within chamber C or as long as the controller does not cause a combination of openings of solenoid valves 24A and 24B such as to reduce the pressure in chamber C.

The same measure can be adopted in the embodiment of FIG. 13A.

The mode of operation shown in the left part of FIG. 15 is activated in the conditions of reduced operation of the engine, below a determined load of the engine and/or below a determined speed of revolution of the engine. In this condition, the solenoid valve 24B is maintained always opened, whereas the solenoid valve 24A is closed during the normal lift cycle of the cam, so that the actuator 21 of the intake valve VT is sensitive to the movement of the cam, whereas the intake valve VS, since it is isolated with respect to the pressure chamber C, remains always stationary in its closed position, also because its actuator communicates to the discharge channel 270, due to that the solenoid valve 24B is opened. In particular, in the case of particularly reduced engine loads and a relatively large combustion chambers, it might be preferable to open even only partially the valve VT, while maintaining anyhow closed the valve VS.

In an intermediate condition of operation of the engine, the mode of operation shown in the central part of FIG. 15, of the mode of operation shown in the right part of FIG. 15, can be activated.

With reference to the mode shown in the central part of FIG. 15, in this case, at the beginning of the lift cycle of the cam, only the solenoid valve 24B is closed, so as to interrupt the communication of both the actuators 21 with the discharge channel, whereas the two actuators are in communication with the pressure chamber C. Therefore, both the intake valves VT, VS start their normal lift cycle. In an intermediate phase of the lift cycle of the cam, the solenoid valve 24A is closed so as to interrupt the communication between the branch-off point D1 and the branch-off point D2. As a result of this, the intake valve VT continues its lift cycle, thus reaching a lift which is anyhow greater than TL, whereas the intake valve VS is isolated both with respect to the pressure chamber C (solenoid valve 24A closed) and with respect to the discharge channel (solenoid valve 24B closed) remains in a stationary position corresponding to the reached partial opening position (in FIG. 15 by dotted line there are shown different degrees of lift of valve VS which can be obtained by varying the closing time of solenoid valve 24A). At the end of the lift cycle of the cam, both the solenoid valves 24A, 24B are opened thus establishing again the communication of both of the actuators 21 whit the discharge channel 270, so as to enable a normal complete closing of both the intake valves.

The mode of operation shown in the right part of FIG. 15 is a mode of operation in which the intake valve VT performs an initial lift cycle with a law of motion which is higher with respect to profile TL, since the solenoid 24A is closed whereas the intake valve VS is opened with the delay, that is when the solenoid valve 24A is opened and the solenoid valve 24B is closed, so that it performs a partial lift cycle after which it is closed simultaneously with the closing of the intake valve VT.

Both the solenoid valves are opened again at the final stage of the lift cycle of the cam, so as to enable closing of both the intake valves.

Third Embodiment of the Invention

From a technical standpoint, the invention can be also actuated with a system for variable actuation of the intake valves according to the configuration diagrammatical shown in FIG. 16. In this embodiment, the actuation system is substantially duplicated, since it has two separate hydraulic circuits for actuating the intake valves VT, VS of each cylinder. In this case it is therefore necessary to provide two different pumping cylinders 16 for the two intake valves VT, VS, these cylinders being actuated by two respective cams (not shown). The system has two solenoid valves 24A, 24B of an on/off two-position type, of any known type, which control the communication of a respective pressure chamber C with the discharge channel 270. Each of the two pressure chambers C is in communication with the respective actuator 21 of a respective intake valve.

A variable actuation system of the type shown in FIG. 16 enables maximum flexibility to be obtained in terms of differentiated modes of operation for the two intake valves VT, VS, but naturally it implies a greater complication of the structure of the engine and a higher production costs.

However, the actuation system shown in FIG. 16 does not enable, when the valve VS is closed, an increased law of motion for the valve VT which is opened. Therefore, for introducing the same quantity of air into the cylinder it is necessary, when only valve VT is opened, to increase also the duration of the intake event which could have not the same beneficial effects from the standpoint of an increase of the momentum within the combustion chamber with respect to the cases shown in FIGS. 13 and 14, which therefore represent preferred embodiments.

Naturally, while the principle of the invention remains the same, the embodiments and the details of construction may widely vary with respect to what has been described and shown purely by way of example, without departing from the scope of the present invention, as defined in the annexed claims.

For example, the hydraulic actuators of the two intake valves VT and VS could be not identical with each other, so that, for example, while being connected to the same pressure chamber C, in a conventional mode of operation the two intake valves would have laws of motion differentiated from each other.

The invention claimed is:

1. An internal combustion engine, comprising:
   a plurality of cylinders, each cylinder including:
   a combustion chamber (2),
   first and second intake conduits (4) and at least one exhaust conduit (6) communicating with said combustion chamber (2),
   first and second intake valves (VT, VS) respectively associated with said first and second intake conduits (4), and at least one exhaust valve (70) respectively associated with said at least one exhaust conduit (6), each intake and exhaust valve (VT, VS, 70) biased towards a closed position via a respective return spring (9),
   a hydraulic actuator (21) associated with each of the first and second intake valves (VT, VS), each hydraulic actuator including a chamber,
   at least one tappet (15) configured to drive the first and second intake valves (VT, VS) against an action of said respective return springs (9), said at least one tappet (15) comprising a hydraulic circuit including a pumping piston (16) configured to communicate a volume of pressurized fluid (C) with the chamber of said hydraulic actuator (21) of at least one of the first and second intake valves (VT, VS), and
   at least one electrically-actuated control valve (24) disposed in the hydraulic circuit, said at least one control valve (24) configured to selectively communicate said volume of pressurized fluid (C) with a discharge channel (270) so as to decouple said at least one of the first and second intake valves (VT, VS) from said at least one tappet (15) thereby causing said at least one of the first and second intake valves (VT, VS) to close via the action of said respective return spring (9),
   a camshaft (11) configured to actuate said at least one tappet (15) of each cylinder, and
   at least one electronic controller (25) configured to control said at least one control valve (24) of each cylinder so as to vary an opening time and a lift amount of each intake valve (VT, VS) as a function of one or more operating parameters of the engine,
   wherein:
   each first intake conduit (4) is configured to generate a tumble motion of airflow introduced into the cylinder when the associated first intake valve (VT) is at least partially opened,
   each second intake conduit (4) is configured to generate a swirl motion of airflow introduced into the cylinder when the associated second intake valve (VS) is at least partially opened,
   said electronic controller (25) is configured to control said at least one control valve (24) of each cylinder such that:
   only the first intake valve (VT) is at least partially opened during a reduced operation in which the engine is operating below a predetermined engine load and/or below a predetermined engine speed, and
   the first and second intake valves (VT, VS) are at least partially opened during remaining operations of the engine.

2. The engine according to claim 1, wherein in each cylinder the first and second intake valves (VT, VS) are actuated via a single cam (14) of said camshaft (11) through a single hydraulic circuit,
   wherein said at least one control valve (24) comprises a single electrically-actuated control valve (24) configured as a three-way, three-position valve, comprising::
   an inlet (i) permanently communicating with said volume of pressurized fluid (C) and with the hydraulic actuator (21) of said first intake valve (VT),
   a first outlet (u1) communicating with the hydraulic actuator (21) of the second intake valve (VS), and
   a second outlet (u2) communicating with said discharge channel (270), and
   wherein said single control valve (24) is configured to switch between:
   a first position (P1) in which the inlet (i) communicates with the first and second outlets (u1, u2) such that the volume of pressurized fluid (C) and the hydraulic actuators (21) of the first and second intake valves (VT, VS) are discharged, and the first and second intake valves (VT, VS) are maintained closed via the action of said respective return springs (9),
   a second position (P2) in which the inlet (i) communicates only with the first outlet (u1) such that the volume of pressurized fluid (C) is isolated from the discharge channel (270) and is in communication with the hydraulic actuators (21) of the first and second intake valves (VT, VS) so as to activate the first and second intake valves (VT, VS), and
   a third position (P3) in which the inlet does not communicate with the first and second outlets (u1, u2) such that said volume of pressurized fluid (C) is isolated from the discharge channel (270) and from the hydraulic actuator of the second intake valve (VS) so as to activate said first intake valve (VT) and deactivate the second intake valve (VS).

3. The engine according to claim 2, wherein the hydraulic actuator (21) of said first intake valve (VT) further includes a discharge outlet configured to prevent a lift amount of said first intake valve (VT) from exceeding a predetermined maximum limit when the pressurized fluid (C) is transferred only to the hydraulic actuator (21) of said first intake valve (VT) during said reduced operation of the engine.

4. The engine according to claim 1, wherein in each cylinder the first and second intake valves (VT, VS) are actuated via a single cam (14) of said camshaft (11) through a single hydraulic circuit,
   wherein said at least one control valve (24) comprises first and second electrically-actuated control valves (24A, 24B), each of an on/off two-position type, arranged in series along a hydraulic line (L) of the single hydraulic circuit,
   wherein said communication hydraulic line (L) extends from said pumping piston (16) towards said discharge channel (270), the hydraulic line (L) including:
   a first branch-off point (D1) connected to the hydraulic actuator (21) of said first intake valve (VT), and a second branch-off point (D2) connected to the hydraulic actuator (21) of said second intake valve (VS),
wherein said first control valve (24B) is arranged between said second branch-off point (D2) and the discharge channel (270) such that the hydraulic actuator (21) of said second intake valve (VS) is isolated from the discharge channel (270) when said first control valve (248) is closed thereby enabling the second intake valve (VS) to open when the associated actuator (21) is supplied with pressurized fluid from the volume of pressurized fluid (C), and
wherein the second control valve (24A) is arranged between said first and second branch-off points (D1, D2), such that when said second control valve (24A) is closed:
the hydraulic actuator (21) of the first intake valve (VT) is always in communication with the volume of pressurized fluid (C) and is isolated from the discharge channel (270) independent of a position of the first control valve (24B), and
the actuator (21) of the second intake valve (VS) is isolated from the volume of pressurized fluid (C) independent of a position of the first control valve (24B).

5. The engine according to claim 1, wherein in each cylinder the first and second intake valves (VT, VS) are respectively actuated via two separate cams (14) of said camshaft (11) through respective hydraulic circuits,
wherein said at least one tappet (15) comprises two separate tappets (15) respectively associated with each hydraulic circuit, and
wherein said at least one control valve (24) comprises first and second electrically-actuated control valves (24A, 24B), each of an on/off two-position type, respectively arranged in each hydraulic circuit.

6. The engine according to claim 1, wherein said electronic controller is further configured to control said at least one control valve (24) such that said second intake valve (VS) is only partially opened during an intermediate operation in which the engine is operating above said predetermined engine load and/or above said predetermined engine speed of the reduced operation.

7. The engine according to claim 6, wherein said second intake valve (VS) is maintained in a stationary position corresponding to a predetermined partial lift during each opening cycle of said second intake valve (VS) when in said intermediate operation of the engine.

8. The engine according to claim 6, wherein said second intake valve (VS) is opened with a delay with respect to a normal start timing of each opening cycle of said second intake valve (VS) when in said intermediate operation of the engine.

9. The engine according to claim 8, wherein said second intake valve (VS) is closed together with the first intake valve (VT) at a normal end timing of each opening cycle of said second intake valve (VS) when in said intermediate operation of the engine.

10. The engine according to claim 6, wherein said second intake valve (VS) is partially opened and completely closed a plurality of times during each opening cycle of said second intake valve (VS) when in said intermediate operation of the engine.

11. The engine according to claim 6, wherein said second intake valve (VS) is closed with a delay with respect to a normal end timing of each opening cycle of said second intake valve (VS) when in said intermediate operation of the engine.

12. The engine according to claim 1, wherein in each cylinder the hydraulic actuators (21) of the first and second intake valves (VT, VS) are not identical with each other such that the first and second intake valves (VT, VS) follow lift profiles which are different from each other when actuated in a conventional operation of the engine.

13. A method for controlling operation of an internal combustion engine comprising:
a plurality of cylinder, each cylinder including:
a combustion chamber (2),
first and second intake conduits (4) and at least one exhaust conduit (6) communicating with said combustion chamber (2),
first and second intake valves (VT, VS), respectively associated with said first and second intake conduits (4), and at least one exhaust valve (70) respectively associated with said at least one exhaust conduit (6), each intake and exhaust valve (VT. VS, 70) biased towards a closed position via a respective return spring (9),
a hydraulic actuator (21) associated with each of the first and second intake valves (VT, VS), each hydraulic actuator including a chamber,
at least one tappet (15) configured to drive the first and second intake valves (VT, VS) against an action of said respective return springs (9), said at least one tappet (15) comprising a hydraulic circuit including a pumping piston (16) configured to communicate a volume of pressurized fluid (C) with the chamber of said hydraulic actuator (21) of at least one of the first and second intake valves (VT, VS), and
at least one electrically-actuated control valve (24) disposed in the hydraulic circuit, said at least one control valve (24) configured to selectively communicate said volume of pressurized fluid (C) with a discharge channel (270) so as to decouple said at least one of the first and second intake valves (VT, VS) from said at least one tappet (15) thereby causing said at least one of the first and second intake valves (VT, VS) to close via the action of said respective return spring (9),
a camshaft (11) configured to actuate said at least one tappet (15), and
at least one electronic controller (25) configured to control said at least one control valve (24) of each cylinder so as to vary an opening time and a lift amount of each intake valve (VT, VS) as a function of one or more operating parameters of the engine,
the method comprising;
configuring each first intake conduit (4) so as to generate a tumble motion of airflow introduced into the cylinder when the associated intake valve (VT) is at least partially opened,
configuring each second intake conduit (4) so as to generate a swirl motion of airflow introduced into the cylinder when the associated second intake valve (VS) is at least partially opened, and
controlling, via said at least one electronic controller (25), said at least one control valve (24) of each cylinder such that:
only the first intake valve (VT) is at least partially opened during a reduced operation in which the engine is operating below a predetermined engine load and/or below a predetermined engine speed, and the first and second intake valves (VT, VS) are at least partially opened during remaining operations of the engine.

14. The method according to claim 13, wherein said electronic controller (25) controls said at least one control valve (24) such that said second intake valve (VS) is only partially opened during an intermediate operation in which the engine is operating above said predetermined engine load and/or above said predetermined engine speed of the reduced operation.

15. The method according to claim 14, wherein said second intake valve (VS) is maintained in a stationary position corresponding to a predetermined partial lift during each opening cycle of said second intake valve (VS) when in said intermediate operation of the engine.

16. The method according to claim 14, wherein said second intake valve (VS) is opened with a delay with respect to a normal start timing of each opening cycle of said second intake valve (VS) when in said intermediate operation of the engine.

17. The method according to claim 16, wherein said second intake valve (VS) is closed together with the first intake valve (VT) at a normal end timing of each opening cycle of said second intake valve (VS) when in said intermediate operation of the engine.

18. The method according to claim 14, wherein said second intake valve (VS) is partially opened and completely closed a plurality of times during each opening cycle of said second intake valve (VS) when in said intermediate operation of the engine.

19. The method according to claim 14, wherein said second intake valve (VS) is closed with a delay with respect to a normal end timing of each opening cycle of said second intake valve (VS) when in said intermediate operation of the engine.

20. The method according to claim 13, wherein a lift amount of said first intake valve (VT) is prevented from exceeding a maximum predetermined limit during said reduced operation of the engine.

21. The method according to claim 13, wherein an opening timing of the first intake valve (VT) is varied with respect to a normal start timing of each opening cycle of said first intake valve (VT) when in said reduced operation of the engine.

22. The method according to claim 13, wherein each cylinder further includes a piston configured to reciprocate within the combustion chamber, and wherein in each cylinder the first intake valve (VT) is opened when the piston achieves a predetermined speed and/or has travelled through one third of an intake stroke during said reduced operation of the engine.

* * * * *